(12) United States Patent
Waters

(10) Patent No.: US 8,567,945 B2
(45) Date of Patent: Oct. 29, 2013

(54) ILLUMINATED EYEWEAR

(71) Applicant: Michael Waters, Aspen, CO (US)

(72) Inventor: Michael Waters, Aspen, CO (US)

(*) Notice: Subject to any disclaimer, the term of this patent is extended or adjusted under 35 U.S.C. 154(b) by 0 days.

(21) Appl. No.: 13/869,746

(22) Filed: Apr. 24, 2013

(65) Prior Publication Data

US 2013/0235333 A1    Sep. 12, 2013

Related U.S. Application Data

(63) Continuation of application No. 12/895,456, filed on Sep. 30, 2010, now Pat. No. 8,444,266.

(60) Provisional application No. 61/247,243, filed on Sep. 30, 2009.

(51) Int. Cl.
  *G02C 1/00* (2006.01)
  *G02C 11/04* (2006.01)
  *G02C 5/14* (2006.01)

(52) U.S. Cl.
  CPC ............... *G02C 11/04* (2013.01); *G02C 5/146* (2013.01)
  USPC .............................. 351/158; 351/121; 362/103

(58) Field of Classification Search
  CPC .................................. G02C 11/04; G02C 5/146
  USPC ............ 351/41, 111, 119, 121, 158; 362/103, 362/105
  See application file for complete search history.

(56) References Cited

U.S. PATENT DOCUMENTS

| 1,255,265 A | 2/1918 | Zachara |
|---|---|---|
| 1,261,824 A | 4/1918 | La Vine |

(Continued)

FOREIGN PATENT DOCUMENTS

| CA | 2 466 175 A1 | 5/2003 |
|---|---|---|
| CA | 2 608 746 A1 | 11/2006 |

(Continued)

OTHER PUBLICATIONS

Notification of Transmittal of the International Search Report and the Written Opinion of the International Searching Authority, or the Declaration from the International Bureau of WIPO for International Application No. PCT/US10/50978, dated Dec. 3, 2010, 16 pages.

(Continued)

*Primary Examiner* — Huy K Mai
(74) *Attorney, Agent, or Firm* — Fitch, Even, Tabin & Flannery, LLP

(57) ABSTRACT

Illuminated eyewear is provided. In one form, the temple arm members have all the lighting components mounted thereto including for each temple arm member a light, power source for the light, and electrical connections including a switch for providing power from the power source to the light. In another form, the cross-frame member has blinder portions integrally formed at either end thereof which are configured to block stray light to avoid glare problems. The blinder portions preferably include surfaces that are inclined to generally extend along the light cone generated by an LED light source mounted to the front end portion of each of the temple arm members. In another form, the temple arm members each have a recessed cavity formed in inner surface portion thereof in which the power source and switch components are received with the switch actuator mounted to the inner surface portion so it is hidden from view when the eyewear is worn for enhanced aesthetics.

14 Claims, 15 Drawing Sheets

(56) References Cited

U.S. PATENT DOCUMENTS

| | | |
|---|---|---|
| 1,438,586 A | 12/1922 | Eaton |
| 1,448,353 A | 3/1923 | Barany |
| 1,572,210 A | 2/1926 | Kolibas |
| 1,615,067 A | 1/1927 | Boerman |
| 1,663,402 A | 3/1928 | Engel |
| 1,879,512 A | 9/1932 | Rotea |
| 2,196,543 A | 4/1940 | Anderson |
| 2,461,254 A | 2/1949 | Bassett |
| 2,531,585 A | 11/1950 | Pope |
| 2,567,046 A | 9/1951 | Anderson |
| 2,591,112 A | 4/1952 | Zwierzynski |
| 2,638,532 A | 5/1953 | Brady |
| 2,904,670 A | 9/1959 | Calmes |
| 2,966,580 A | 12/1960 | Taylor |
| 3,060,308 A | 10/1962 | Fortuna |
| D207,919 S | 6/1967 | Fai |
| 3,350,552 A | 10/1967 | Lawrence |
| D215,751 S | 10/1969 | Castelliano |
| 3,602,759 A | 8/1971 | Evans et al. |
| 3,634,676 A | 1/1972 | Castellano |
| 3,647,059 A | 3/1972 | Humphreys |
| 3,683,168 A | 8/1972 | Tatje |
| 3,769,663 A | 11/1973 | Perl |
| D229,975 S | 1/1974 | Klugmann |
| 3,793,517 A | 2/1974 | Carlini |
| 4,210,952 A | 7/1980 | Ressmeyer |
| 4,254,451 A | 3/1981 | Cochran, Jr. |
| 4,283,127 A | 8/1981 | Rosenwinkel et al. |
| 4,332,007 A | 5/1982 | Gibstein et al. |
| 4,406,040 A | 9/1983 | Cannone |
| 4,462,064 A | 7/1984 | Schweitzer |
| 4,516,157 A | 5/1985 | Campbell |
| 4,541,698 A | 9/1985 | Lerner |
| 4,570,206 A | 2/1986 | Deutsch |
| 4,616,297 A | 10/1986 | Liu |
| 4,631,644 A | 12/1986 | Dannhauer |
| 4,774,643 A | 9/1988 | McGinnis et al. |
| 4,822,160 A | 4/1989 | Tsai |
| 4,822,161 A | 4/1989 | Jimmy |
| 4,902,119 A | 2/1990 | Porsche |
| 4,904,078 A | 2/1990 | Gorike |
| 4,959,760 A | 9/1990 | Wu |
| 4,963,045 A | 10/1990 | Willcox |
| 5,070,436 A | 12/1991 | Alexander et al. |
| 5,113,325 A | 5/1992 | Eisenbraun |
| 5,122,943 A | 6/1992 | Pugh |
| 5,140,220 A | 8/1992 | Hasegawa |
| 5,143,443 A | 9/1992 | Madsen |
| 5,158,356 A | 10/1992 | Guthrie |
| 5,164,749 A | 11/1992 | Shelton |
| 5,183,326 A | 2/1993 | Case |
| 5,189,512 A | 2/1993 | Cameron et al. |
| 5,218,385 A | 6/1993 | Lii |
| 5,230,558 A | 7/1993 | Jong |
| 5,245,516 A | 9/1993 | de Haas et al. |
| D343,470 S | 1/1994 | Yuen |
| 5,278,734 A | 1/1994 | Ferber |
| D349,123 S | 7/1994 | Cooley et al. |
| 5,331,333 A | 7/1994 | Tagawa et al. |
| 5,331,357 A | 7/1994 | Cooley et al. |
| 5,367,345 A | 11/1994 | da Silva |
| 5,438,698 A | 8/1995 | Burton et al. |
| 5,452,190 A | 9/1995 | Priesemuth |
| 5,460,346 A | 10/1995 | Hirsch |
| 5,485,358 A | 1/1996 | Chien |
| 5,541,767 A | 7/1996 | Murphy et al. |
| 5,541,816 A | 7/1996 | Miserendino |
| 5,546,099 A | 8/1996 | Quint et al. |
| D375,372 S | 11/1996 | Allen |
| 5,575,554 A | 11/1996 | Guritz |
| 5,606,743 A | 2/1997 | Vogt et al. |
| 5,608,808 A | 3/1997 | da Silva |
| 5,610,678 A | 3/1997 | Tsuboi et al. |
| D383,754 S | 9/1997 | Yuen |
| D383,863 S | 9/1997 | Yuen |
| 5,667,291 A | 9/1997 | Caplan et al. |
| 5,667,292 A | 9/1997 | Sabalvaro |
| D388,113 S | 12/1997 | Feinbloom |
| 5,708,449 A | 1/1998 | Heacock et al. |
| 5,722,762 A | 3/1998 | Soll |
| 5,741,060 A | 4/1998 | Johnson |
| 5,786,665 A | 7/1998 | Ohtsuki et al. |
| 5,806,961 A | 9/1998 | Dalton et al. |
| 5,836,673 A | 11/1998 | Lo |
| D405,901 S | 2/1999 | Feinbloom et al. |
| 5,871,271 A | 2/1999 | Chien |
| 5,893,631 A | 4/1999 | Padden |
| 5,918,966 A | 7/1999 | Arnold |
| 5,946,071 A | 8/1999 | Feldman |
| 5,997,165 A | 12/1999 | Lehrer |
| 6,005,536 A | 12/1999 | Beadles et al. |
| 6,012,822 A | 1/2000 | Robinson |
| 6,012,827 A | 1/2000 | Caplan et al. |
| D420,035 S | 2/2000 | Hartman |
| 6,056,413 A | 5/2000 | Urso |
| D428,431 S | 7/2000 | Jordan |
| 6,086,214 A | 7/2000 | Ridge |
| 6,172,657 B1 | 1/2001 | Kamakura et al. |
| 6,174,075 B1 | 1/2001 | Fuwausa |
| 6,206,543 B1 | 3/2001 | Henry |
| D445,928 S | 7/2001 | Sharrah et al. |
| D446,324 S | 8/2001 | Lynch et al. |
| 6,290,368 B1 | 9/2001 | Lehrer |
| 6,299,323 B1 | 10/2001 | Yu et al. |
| 6,302,570 B1 | 10/2001 | Petell et al. |
| 6,311,837 B1 | 11/2001 | Blaustein et al. |
| 6,320,822 B1 | 11/2001 | Okeya et al. |
| 6,367,949 B1 | 4/2002 | Pederson |
| D457,670 S | 5/2002 | Allen |
| 6,386,701 B1 | 5/2002 | Khulusi |
| 6,390,640 B1 | 5/2002 | Wong et al. |
| 6,439,738 B1 | 8/2002 | Matthews et al. |
| 6,457,838 B1 | 10/2002 | Dugmore et al. |
| 6,461,025 B1 | 10/2002 | Payne |
| 6,474,830 B1 | 11/2002 | Hansen |
| D469,198 S | 1/2003 | Olson |
| 6,504,099 B2 | 1/2003 | Huang |
| 6,523,973 B2 | 2/2003 | Galli |
| 6,530,672 B2 | 3/2003 | Galli |
| D473,890 S | 4/2003 | Waters |
| 6,549,231 B1 | 4/2003 | Matsui |
| 6,554,444 B2 | 4/2003 | Shimada et al. |
| D477,432 S | 7/2003 | Parsons |
| 6,604,837 B2 | 8/2003 | Sandberg |
| 6,612,695 B2 | 9/2003 | Waters |
| 6,612,696 B2 | 9/2003 | Waters |
| D484,905 S | 1/2004 | Waters |
| 6,713,956 B2 | 3/2004 | Hsing Chen et al. |
| 6,749,166 B2 | 6/2004 | Valentine et al. |
| 6,764,194 B1 | 7/2004 | Cooper |
| 6,802,636 B1 | 10/2004 | Bailey, Jr. |
| 6,808,284 B1 | 10/2004 | Chao |
| 6,824,265 B1 | 11/2004 | Harper |
| 6,830,357 B2 | 12/2004 | Lopez |
| D501,266 S | 1/2005 | Harris, Jr. et al. |
| 6,857,739 B1 | 2/2005 | Watson |
| 6,860,628 B2 | 3/2005 | Robertson et al. |
| 6,863,416 B2 | 3/2005 | Waters |
| D507,368 S | 7/2005 | Waters |
| D507,369 S | 7/2005 | Waters |
| 6,929,878 B2 | 8/2005 | Chen et al. |
| 6,966,668 B2 | 11/2005 | Cugini et al. |
| 6,977,776 B2 | 12/2005 | Volkenandt et al. |
| 6,993,803 B2 | 2/2006 | Chan |
| 6,997,552 B1 | 2/2006 | Hung |
| 7,003,353 B1 | 2/2006 | Parkhouse |
| 7,004,582 B2 | 2/2006 | Jannard et al. |
| 7,008,074 B1 | 3/2006 | Halm |
| 7,021,790 B2 | 4/2006 | Parsons |
| 7,094,981 B2 | 8/2006 | Sorrentino et al. |
| 7,104,670 B2 | 9/2006 | Waters |
| 7,105,939 B2 | 9/2006 | Bednyak |
| 7,111,956 B2 | 9/2006 | Brown |
| 7,118,241 B2 | 10/2006 | Sohn |

| | | |
|---|---|---|
| 7,118,262 B2 | 10/2006 | Negley |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,226,180 B2 | 6/2007 | Sung |
| 7,234,831 B1 | 6/2007 | Hanley |
| 7,255,437 B2 | 8/2007 | Howell et al. |
| 7,264,350 B2 | 9/2007 | Jannard et al. |
| D553,177 S | 10/2007 | Chen |
| 7,278,734 B2 | 10/2007 | Jannard et al. |
| 7,281,826 B2 | 10/2007 | Huang |
| D568,922 S | 5/2008 | Anderl |
| 7,377,664 B2 | 5/2008 | Waters |
| 7,422,324 B2 | 9/2008 | Lee |
| 7,438,409 B2 | 10/2008 | Jordan |
| 7,562,979 B2 | 7/2009 | Waters |
| D600,738 S | 9/2009 | Su et al. |
| 7,607,775 B2 | 10/2009 | Hermanson et al. |
| 7,661,818 B2 | 2/2010 | Waters |
| D611,086 S | 3/2010 | Meng-Suen |
| 7,699,486 B1 * | 4/2010 | Beiner ............... 362/105 |
| D617,826 S | 6/2010 | Waters |
| 7,862,979 B2 | 1/2011 | Morris et al. |
| 7,938,553 B1 | 5/2011 | Beiner |
| 7,942,522 B2 | 5/2011 | Sonsino |
| 7,946,705 B1 | 5/2011 | Hsu |
| 7,997,724 B1 | 8/2011 | Hsu |
| 8,007,101 B1 | 8/2011 | Wang |
| 8,109,630 B2 | 2/2012 | Sonsino |
| 8,152,330 B2 | 4/2012 | Waters |
| 8,235,524 B2 | 8/2012 | Waters |
| D682,343 S | 5/2013 | Waters |
| 8,444,266 B2 | 5/2013 | Waters |
| 8,491,118 B2 | 7/2013 | Waters |
| 2002/0131275 A1 | 9/2002 | Yamamoto et al. |
| 2002/0163800 A1 | 11/2002 | Hansen |
| 2002/0186557 A1 | 12/2002 | Lary et al. |
| 2002/0187806 A1 | 12/2002 | Jang |
| 2003/0079387 A1 | 5/2003 | Derose |
| 2003/0086053 A1 | 5/2003 | Waters |
| 2003/0086054 A1 | 5/2003 | Waters |
| 2003/0169207 A1 | 9/2003 | Beigel |
| 2003/0189824 A1 | 10/2003 | Meeder et al. |
| 2003/0206269 A1 | 11/2003 | Waters |
| 2004/0222638 A1 | 11/2004 | Bednyak |
| 2004/0240067 A1 | 12/2004 | Marusi et al. |
| 2004/0240204 A1 | 12/2004 | Russ et al. |
| 2004/0264176 A1 | 12/2004 | Vanderschuit |
| 2005/0001433 A1 | 1/2005 | Seelin |
| 2005/0072458 A1 | 4/2005 | Goldstein |
| 2005/0099799 A1 | 5/2005 | Cugini et al. |
| 2005/0204490 A1 | 9/2005 | Kemp et al. |
| 2005/0211187 A1 | 9/2005 | Harman et al. |
| 2005/0248932 A1 | 11/2005 | Waters |
| 2005/0254238 A1 | 11/2005 | Parker et al. |
| 2005/0265015 A1 | 12/2005 | Salazar |
| 2006/0012974 A1 | 1/2006 | Su |
| 2006/0012975 A1 | 1/2006 | Huttner et al. |
| 2006/0091784 A1 | 5/2006 | Conner et al. |
| 2006/0091787 A1 | 5/2006 | Kabay et al. |
| 2006/0092621 A1 | 5/2006 | Lai |
| 2006/0138440 A1 | 6/2006 | Jyo |
| 2006/0158895 A1 | 7/2006 | Brands et al. |
| 2006/0197905 A1 | 9/2006 | Lu |
| 2006/0198122 A1 | 9/2006 | Senter et al. |
| 2006/0232239 A1 | 10/2006 | Maglica et al. |
| 2006/0238995 A1 | 10/2006 | Wang |
| 2006/0239018 A1 | 10/2006 | Jardin |
| 2006/0291193 A1 | 12/2006 | Hill |
| 2007/0013865 A1 | 1/2007 | Jordan |
| 2007/0030442 A1 | 2/2007 | Howell et al. |
| 2007/0053179 A1 | 3/2007 | Pang et al. |
| 2007/0058361 A1 | 3/2007 | Sevilla, II |
| 2007/0074752 A1 | 4/2007 | Shau et al. |
| 2007/0127250 A1 | 6/2007 | Waters |
| 2007/0145746 A1 | 6/2007 | Biamonte |
| 2007/0153500 A1 | 7/2007 | Waters |
| 2007/0153537 A1 | 7/2007 | Scott et al. |
| 2007/0159810 A1 | 7/2007 | Kim |
| 2007/0159823 A1 | 7/2007 | Ho et al. |
| 2007/0189003 A1 | 8/2007 | Daley |
| 2007/0206373 A1 | 9/2007 | Whiteside et al. |
| 2007/0236649 A1 | 10/2007 | Lin |
| 2007/0236915 A1 | 10/2007 | Chen |
| 2007/0236916 A1 | 10/2007 | Hsu |
| 2008/0069391 A1 | 3/2008 | Steyn et al. |
| 2008/0130272 A1 | 6/2008 | Waters |
| 2009/0190026 A1 | 7/2009 | Chen |
| 2009/0213323 A1 | 8/2009 | Hermanson et al. |
| 2010/0134761 A1 | 6/2010 | Johns et al. |
| 2010/0182563 A1 | 7/2010 | Waters |
| 2011/0013135 A1 | 1/2011 | Waters |
| 2011/0075095 A1 | 3/2011 | Waters |
| 2011/0187989 A1 | 8/2011 | Waters |
| 2011/0211156 A1 | 9/2011 | Beiner |
| 2011/0228211 A1 | 9/2011 | Waters |
| 2012/0062830 A1 | 3/2012 | Waters |
| 2012/0155064 A1 | 6/2012 | Waters |

FOREIGN PATENT DOCUMENTS

| | | | |
|---|---|---|---|
| CA | 2 610 073 | A1 | 5/2008 |
| CN | 1603677 | A | 4/2005 |
| CN | 2826472 | Y | 10/2006 |
| CN | 201548769 | U | 8/2010 |
| CN | 101950091 | A | 1/2011 |
| CN | 201707513 | U | 1/2011 |
| CN | 301445845 | S | 1/2011 |
| CN | 201796205 | U | 4/2011 |
| DE | 30 43 007 | A1 | 6/1982 |
| DE | 94 10 886 | U1 | 9/1994 |
| EP | 1451633 | A0 | 9/2004 |
| EP | 2 290 433 | A1 | 3/2011 |
| EP | 2 299 311 | A1 | 3/2011 |
| EP | 2 350 734 | A0 | 8/2011 |
| GB | 2272073 | A | 5/1994 |
| JP | 2004-207580 | A | 7/2004 |
| WO | 01/13033 | A1 | 2/2001 |
| WO | 01/77575 | A1 | 10/2001 |
| WO | 03/040808 | A2 | 5/2003 |
| WO | 2006/124928 | A1 | 11/2006 |
| WO | 2007/058706 | A2 | 5/2007 |
| WO | 2011/041591 | A1 | 4/2011 |
| WO | 2011/100471 | A1 | 8/2011 |
| ZA | 2004/3826 | A | 9/2005 |

OTHER PUBLICATIONS

Docket report of *Waters Industries, Inc. v. Mr. Christmas Incorporated, et al.*, United States District Court for the Northern District of Illinois, Case No. 1:09-cv-07577, filed Dec. 7, 2009, 5 pages.

"Complaint", *Waters Industries, Inc. v. Mr. Christmas Incorporated, et al.*, United States District Court for the Northern District of Illinois, Case No. 1:09-cv-07577, 38 pages (Docket No. 1, Dec. 7, 2009).

Docket report of *Waters Industries, Inc. v. The Gerson Company*, United States District Court for the Northern District of Illinois, Case No. 1:10-cv-01865, filed Mar. 24, 2010, 3 pages.

"Complaint", *Waters Industries, Inc. v. The Gerson Company*, United States District Court for the Northern District of Illinois, Case No. 1:10-cv-01865, 71 pages (Docket No. 1, Mar. 24, 2010).

Docket report of *Waters Industries, Inc. v. Sweet Baby, Inc. dba AJ Morgan et al.*, United States District Court for the Northern District of Illinois, Case No. 1:09-cv-07595, filed Dec. 7, 2009, 7 pages.

"Complaint", *Waters Industries, Inc. v. Sweet Baby, Inc. dba AJ Morgan et al.*, United States District Court for the Northern District of Illinois, Case No. 1:09-cv-07595, 78 pages (Docket No. 1, Dec. 7, 2009).

"Answer to Complaint, Counterclaims", filed by Sweet Baby, Inc. dba AJ Morgan, *Waters Industries, Inc. v. Sweet Baby, Inc. dba AJ Morgan et al.*, United States District Court for the Northern District of Illinois, Case No. 1:09-cv-07595, 15 pages (Docket No. 27, Feb. 4, 2010).

"Answer to Complaint, Counterclaims", filed by Lilian Vernon Corporation, *Waters Industries, Inc. v. Sweet Baby, Inc. dba AJ Morgan*

(56) References Cited

OTHER PUBLICATIONS et al., United States District Court for the Northern District of Illinois, Case No. 1:09-cv-07595, 15 pages (Docket No. 28, Feb. 4, 2010).
Docket report of *Waters Industries, Inc.* v. *Kikkerland Design, Inc.*, United States District Court for the Northern District of Illinois, Case No. 1:10-cv-04076, filed Jun. 30, 2010, 4 pages.
"Complaint", *Waters Industries, Inc.* v. *Kikkerland Design, Inc.*, United States District Court for the Northern District of Illinois, Case No. 1:10-cv-04076, 21 pages (Docket No. 1, Jun. 30, 2010).
"Kikkerland Design, Inc.'s Answer to Complaint, Affirmative Defenses and Counterclaim", *Waters Industries, Inc.* v. *Kikkerland Design, Inc.*, United States District Court for the Northern District of Illinois, Case No. 1:10-cv-04076, 12 pages (Docket No. 17, Aug. 6, 2010).
"Complaint" with Exhibit A through D, *Waters Industries, Inc.* v. *JJI International, Inc.*, et al., United States District Court for the Northern District of Illinois, Case No. 1:11-cv-03791, 73 pages (Document No. 1, Jun. 3, 2011).
"Defendants' Answer and Counterclaim" and "Responses to Specific Allegations", *Waters Industries, Inc.* v. *JJI International, Inc. And Stein Mart, Inc.*, United States District Court for the Northern District of Illinois, Case No. 1:11-cv-03791, 16 pages (Document No. 15, Jun. 28, 2011).
"Plaintiffs Initial Infringement Contentions Under Local Patent Rule 2.2" with Appendix A through F, *Waters Industries, Inc.* v. *JJI International, Inc. And Stein Mart, Inc.*, United States District Court for the Northern District of Illinois, Case No. 1:11-cv-03791, 44 pages (Jul. 26, 2011).
"Defendants' Initial Non-Infringement and Invalidity Contentions" with Appendix A though G, *Waters Industries, Inc.* v. *JJI International, Inc. And Stein Mart, Inc.*, United States District Court for the Northern District of Illinois, Case No. 1:11-cv-03791, 78 pages (Aug. 9, 2011).
"Plaintiff's Initial Response to Invalidity Contentions Under Local Patent Rule 2.5" with Appendix A and B, *Waters Industries, Inc.* v. *JJI International, Inc. And Stein Mart, Inc.*, United States District Court for the Northern District of Illinois, Case No. 1:11-cv-03791, 29 pages (Aug. 23, 2011).
"Defendants' Final Invalidity Contentions" with Appendix A though D, *Waters Industries, Inc.* v. *JJI International, Inc. And Stein Mart, Inc.*, United States District Court for the Northern District of Illinois, Case No. 1:11-cv-03791, 33 pages (Feb. 21, 2012).
"Plaintiffs Final Infringement Contentions Under Local Patent Rule 3.1" with Appendix A though F, *Waters Industries, Inc.* v. *JJI International, Inc. And Stein Mart, Inc.*, United States District Court for the Northern District of Illinois, Case No. 1:11-cv-03791, 58 pages (Feb. 21, 2012).
"Plaintiffs Response to Defendants' Final Invalidity Contentions Under Local Patent Rule 3.2" with Appendix A though D-4, *Waters Industries, Inc.* v. *JJI International, Inc. And Stein Mart, Inc.*, United States District Court for the Northern District of Illinois, Case No. 1:11-cv-03791, 73 pages (Mar. 19, 2012).
"Complaint", *Waters Industries, Inc.* v. *JJI International, Inc.*, United States District Court of the Northern District of Illinois, Case No. 1:12-cv-06195, 4 pages (Aug. 7, 2012).
"Defendant's Answer, Affirmative Defenses and Counterclaim", *Waters Industries, Inc.* v. *JJI International, Inc.*, United States District Court of the Northern District of Illinois, Case No. 1:12-cv-06195, 9 pages (Sep. 4, 2012).
"Plaintiffs Answer to Defendant's Counterclaims", *Waters Industries, Inc.* v. *JJI International, Inc.*, United States District Court of the Northern District of Illinois, Case No. 1:12-cv-06195, 4 pages (Sep. 28, 2012).
"Plaintiffs Initial Infringement Contentions Under Local Patent Rule 2.2" with Appendix A through B, *Waters Industries, Inc.* v. *JJI International, Inc.*, United States District Court of the Northern District of Illinois, Case No. 1:12-cv-06195, 30 pages (Oct. 2, 2012).
"Defendant's Initial Non-Infringement and Invailidity Contentions" with Appendix A through B and Figure D1, *Waters Industries, Inc.* v. *JJI International, Inc.*, United States District Court of the Northern District of Illinois, Case No. 1:12-cv-06195, 31 pages (Oct. 16, 2012).
U.S. Appl. No. 10/006,919, titled "Lighted Reading Glasses," filed Nov. 7, 2001, US Patent No, 6,612,695 issued Sep. 2, 2003..
U.S. Appl. No. 29/161,311, titled "Lighted Eyeglasses," filed May 28, 2002, US Patent No. D473,890 issued Apr. 29,2003.
U.S. Appl. No. 10/145,595, titled "Lighted Reading Glasses," filed May 14, 2002, US Patent No. 6,612,696 issued Sep. 2, 2003.
U.S. Appl. No. 29/175,960, titled "Light Module," filed Feb. 13, 2002, Abandoned.
U.S. Appl. No. 29/176,093, titled "Light Module," filed Feb. 18, 2003, US Patent No. D484,905 issued Jan. 6, 2004.
U.S. Appl. No. 10/425,357, titled "Lighted Reading Glasses," filed Apr. 29, 2003, US Patent No. 6,863,416 issued Mar. 8, 2005.
U.S. Appl. No. 10/841,930, titled "Clip-on Light Apparatus," filed May 7, 2004, Publication No. US2005/0248932 A1, published on Nov. 10, 2005, Abandoned.
U.S. Appl. No. 29/216,913, titled "Light Module," filed Nov. 10, 2004, US Patent No. D507,369 issued Jul. 12, 2005.
U.S. Appl. No. 29/216,912, titled "Dual Light Module," filed Nov. 10, 2004, US Patent No. D507,368 issued Jul. 12, 2005.
U.S. Appl. No. 11/056,652, titled "Lighting Device," filed Feb. 11, 2005, US Patent No. 7,104,670 issued Sep. 12, 2006.
International Application No. PCT/US06/18968, titled "Hands-Free Lighting Devices," filed May 17, 2006, International Publication No. WO2006/124928 published on Nov. 23, 2006.
U.S. Appl. No. 11/455,922, titled "Lighting Device," filed Jun. 19, 2006, US Patent No. 7,377,664 issued May 27, 2008.
U.S. Appl. No. 10/571,796, titled "Lighted Reading Glasses," filed Feb. 22, 2007, US Patent No. 7,562,979 issued Jul. 21, 2009.
U.S. Appl. No. 11/557,748, titled "Clip-On Light Apparatus," filed Nov. 8, 2006, US Patent No. 7,661,818 issued Feb. 16, 2010.
U.S. Appl. No. 11/941,558, titled "Hands-Free Lighting Devices," filed Nov. 16, 2007, US Patent No. 8,388,164, issued Mar. 5, 2013.
U.S. Appl. No. 12/687,822, titled "Lighted Reading Glasses," filed Jan. 14, 2010, US Patent No. 8,152,330 issued Apr. 10, 2012.
U.S. Appl. No. 29/353,829, titled "Lighted Eyeglasses," filed Jan. 14, 2010, US Patent No. D615,826 issued Jun. 15, 2010.
U.S. Appl. No. 12/835,508, titled "Illuminated Eyewear," filed Jul. 13, 2010, US Patent No. 8,235,524 issued Aug. 7, 2012.
U.S. Appl. No. 12/895,456, titled "Illuminated Eyewear," filed Sep. 30, 2011, US Patent No. 8,444,266 issued May 21, 2013.
U.S. Appl. No. 11/978,401, titled "Illuminated Eyeglass Assembly," filed Oct. 29, 2007, US Patent No. 7,699,486, issued Apr. 20, 2010.
U.S. Appl. No. 12/799,137 titled "Illuminated Eyeglass Assembly," filed Apr. 19, 2010, US Patent No. 7,938,553, issued May 10, 2011.
U.S. Appl. No. 13/025,100, titled "Illuminated Eyewear," filed Feb. 10, 2011, Publication No. US2011-0187989 A1, published on Aug. 4, 2011.
U.S. Appl. No. 13/102,821, titled "Lighted Reading Glasses," filed May 6,.2011, Publication No. US2011-0228211 A1, published on Sep. 22, 2011.
U.S. Appl. No. 13/103,971, titled "Illuminated Eyeglass Assembly," filed.May 9, 2011, Publication No. US2011-0211156 A1, published on Sep. 1, 2011.
U.S. Appl. No. 13/232,691, titled "Lighted Glasses," filed Sep. 14,. 2011, Publication No. US2012-0062830 A1, published on Mar. 15, 2012.
U.S. Appl. No. 29/409,506, titled "Lighted Glasses," filed Dec. 23, 2011, US Patent No.D682,343 S, issued May 14, 2013.
U.S. Appl. No. 13/695,417, titled "Lighted Headgear And Accessories Therefor," filed Oct. 30, 2012.
U.S. Appl. No. 13/567,814, titled "Lighted Eyewear," filed Aug. 6, 2012, abandoned on May 6, 2013.

\* cited by examiner

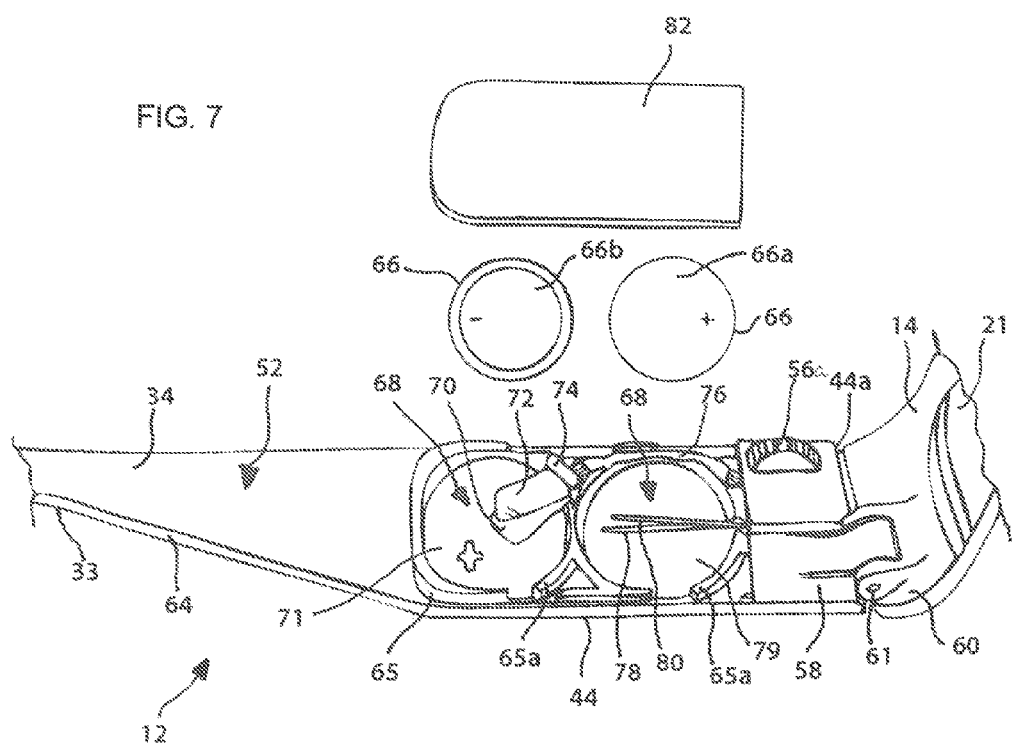

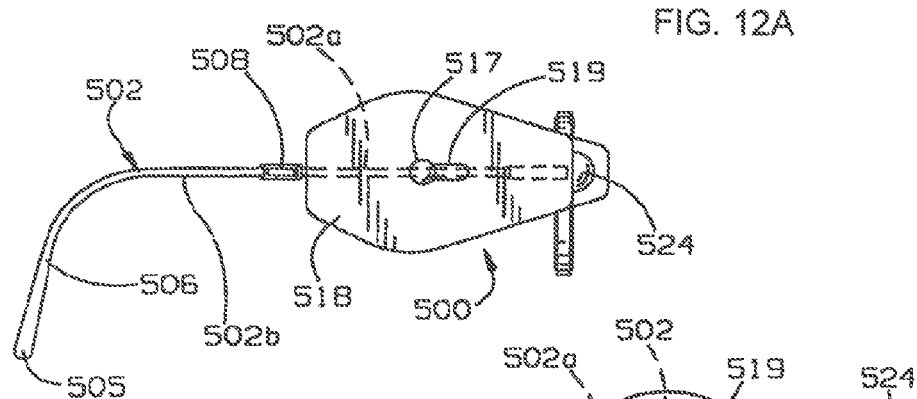
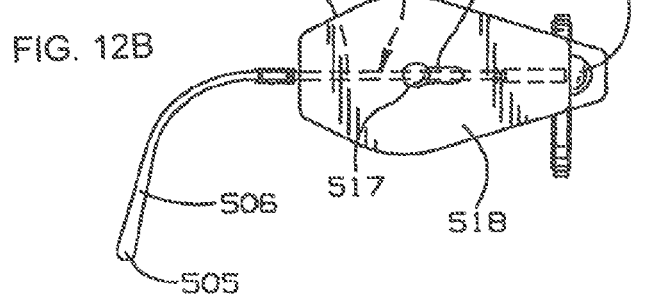
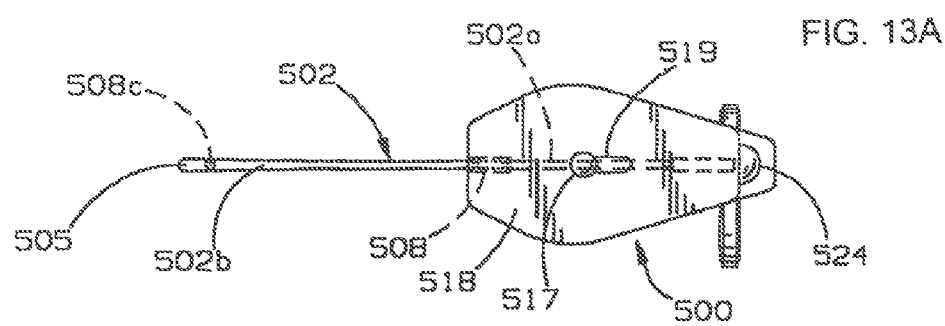
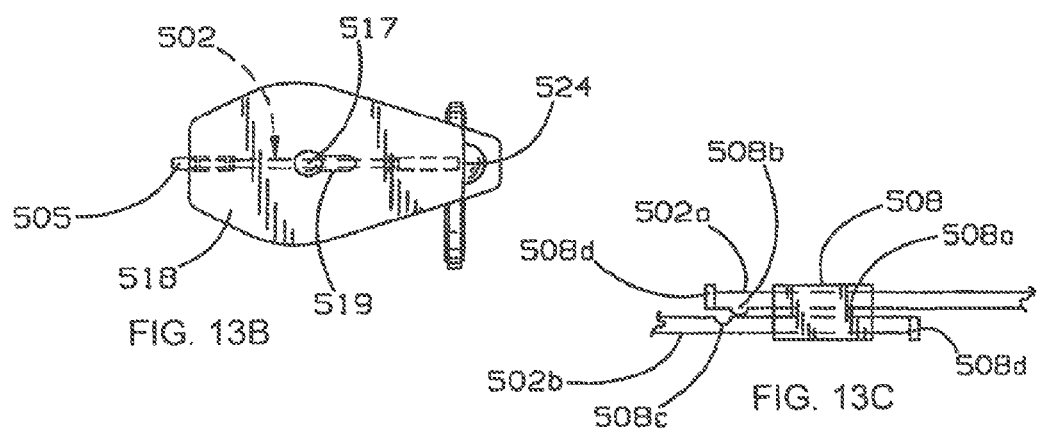

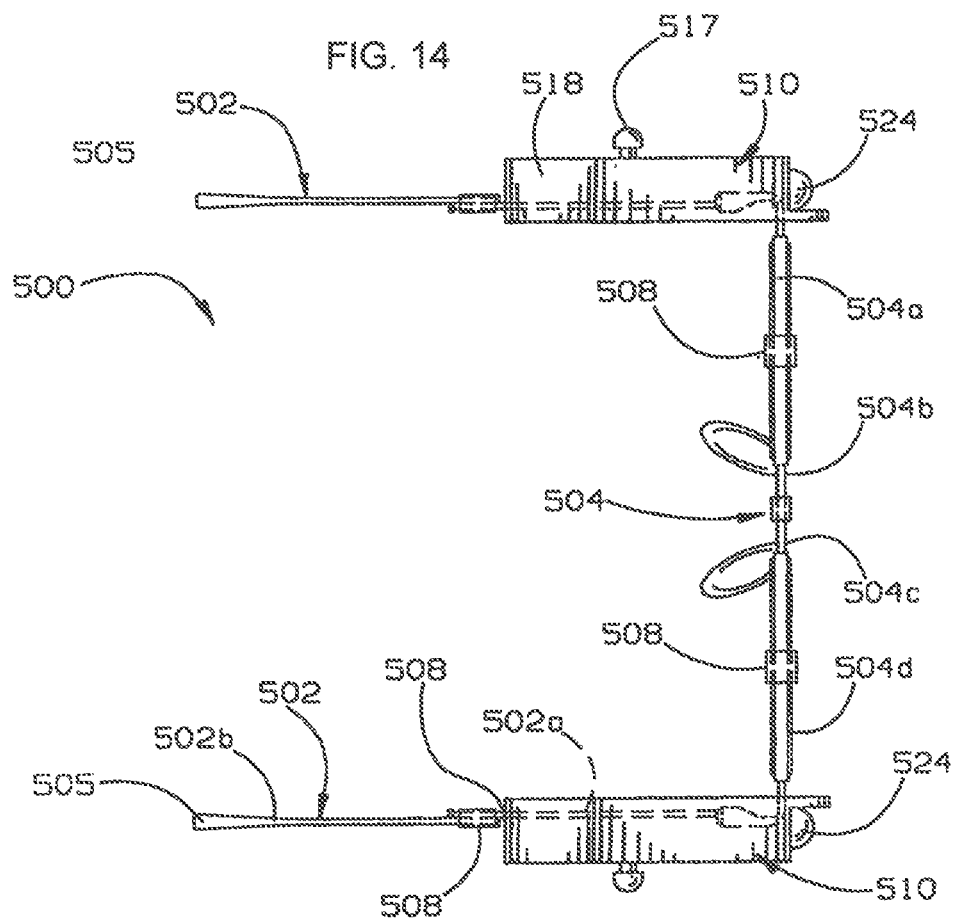
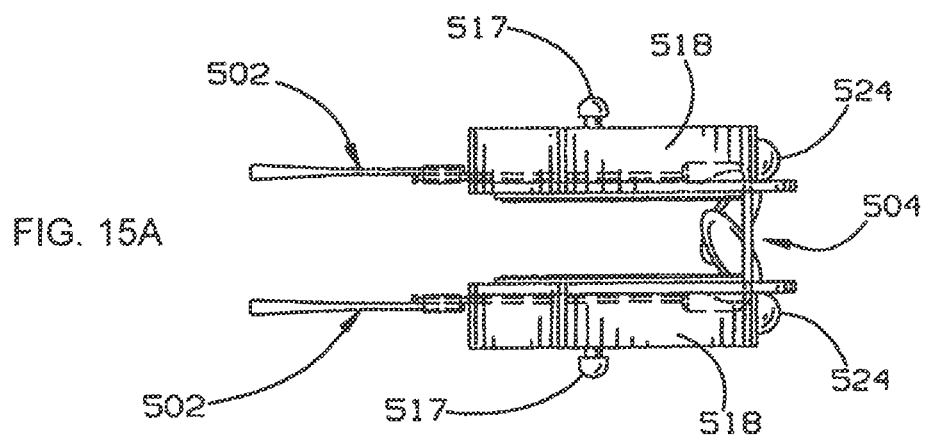

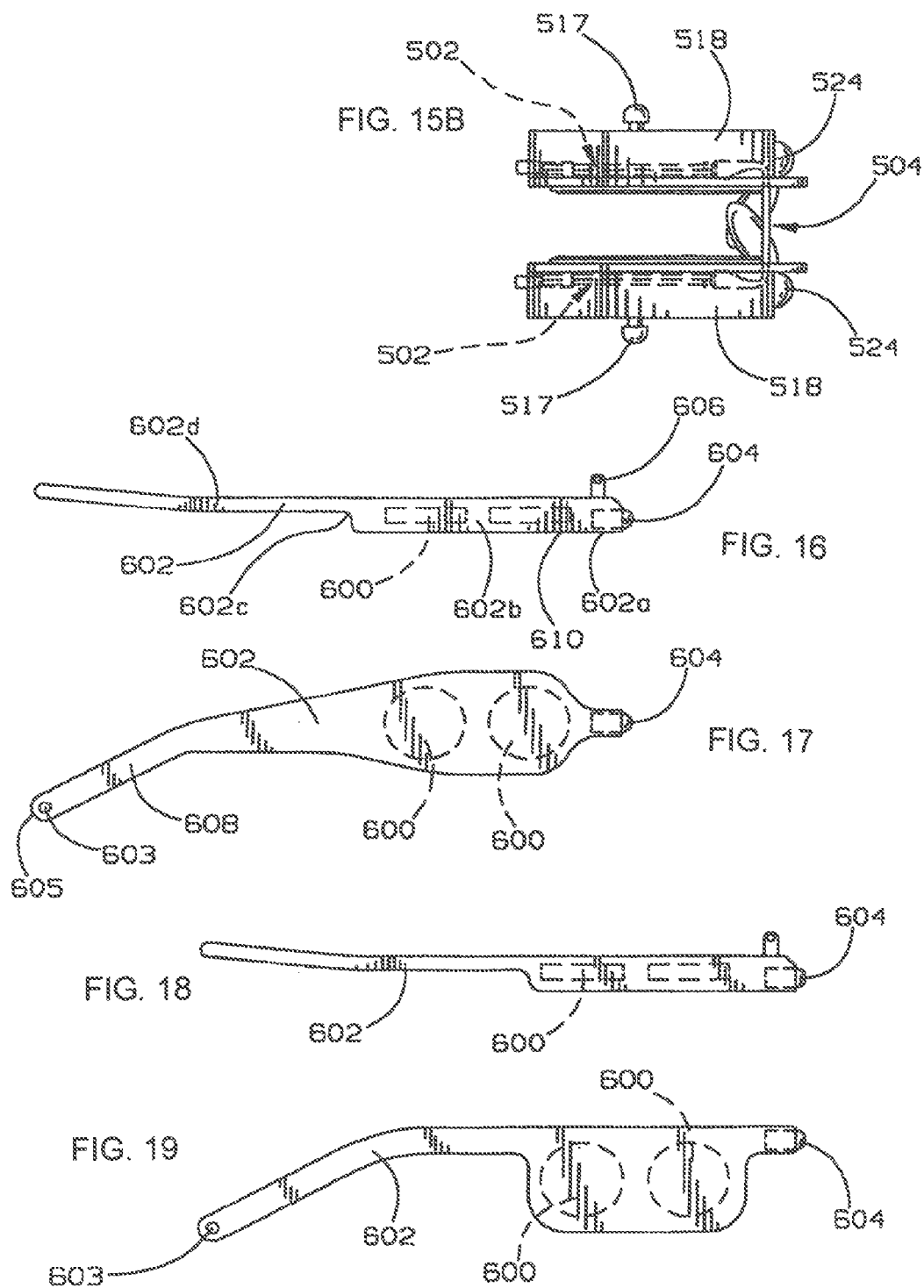

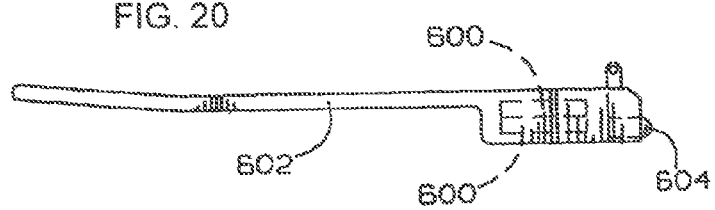
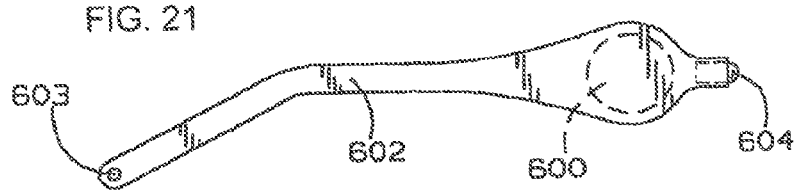
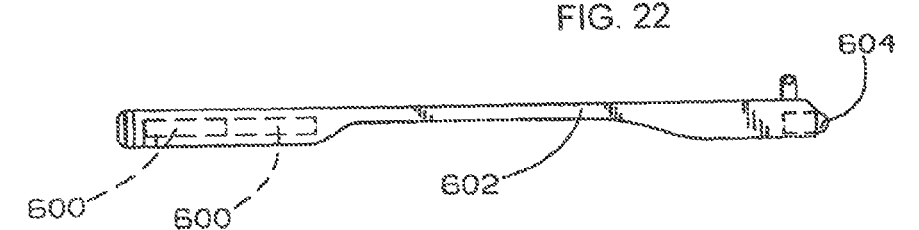
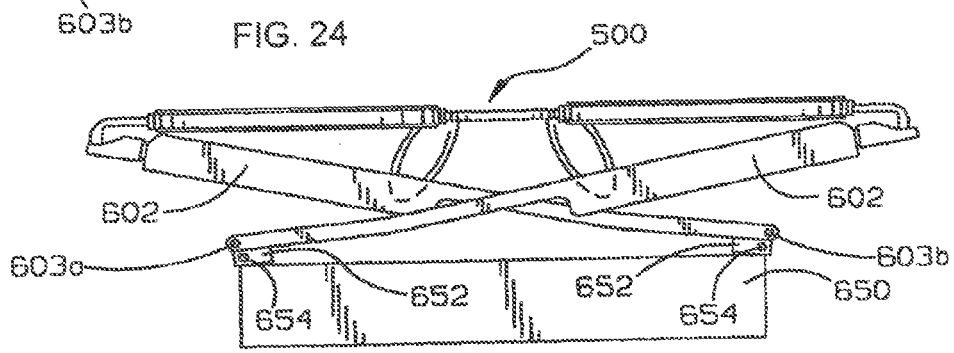

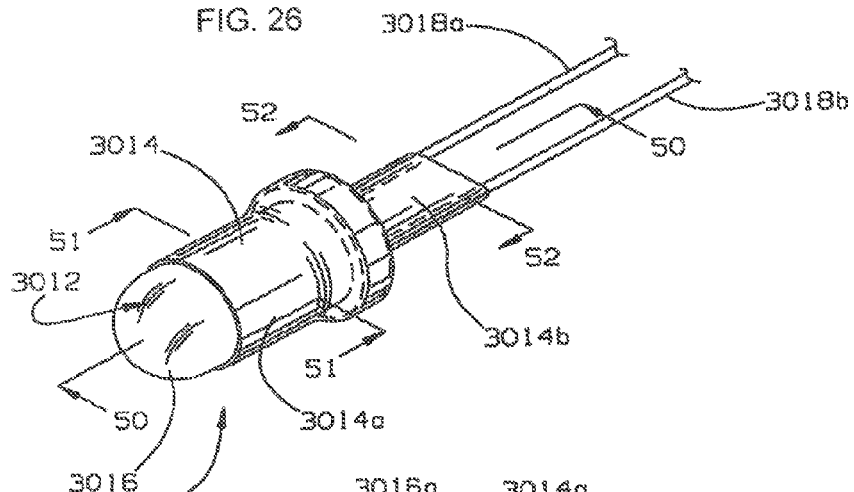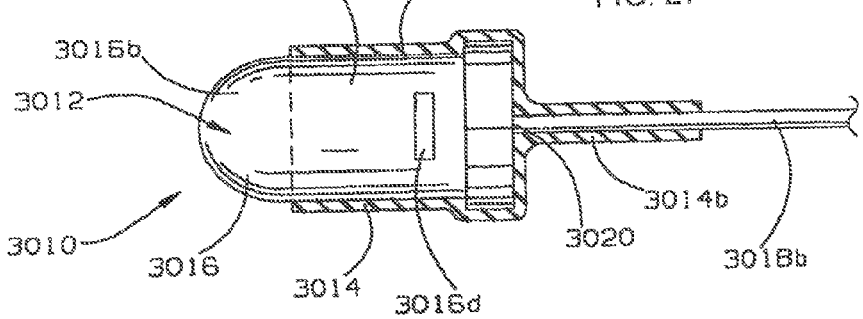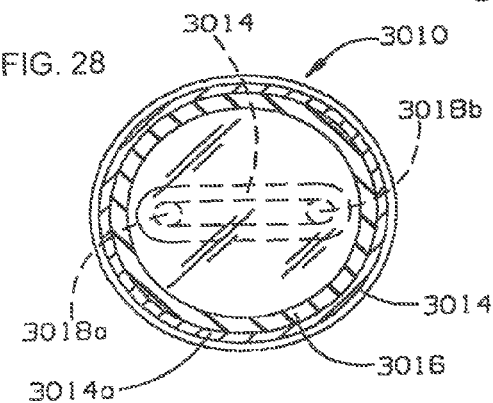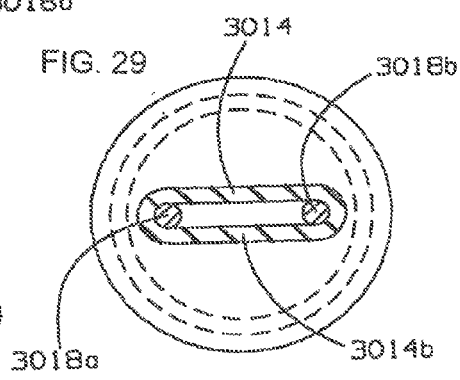

ILLUMINATED EYEWEAR

CROSS REFERENCES TO RELATED APPLICATIONS

This application is a continuation of U.S. application Ser. No. 12/895,456, filed Sep. 30, 2010, which claims benefit of U.S. Provisional Application No. 61/247,243 entitled "Illuminated Eyewear" filed Sep. 30, 2009, the contents of which are incorporated by reference in their entirety herein.

FIELD

The invention relates to hands-free lighting devices and, more particularly, to illuminated eyewear.

BACKGROUND

Often an individual desires a light source to illuminate an area while performing a task or a light source directed in a general outward direction for visibility. Holding a flashlight is an option, but such lighting devices are often cumbersome and may detract from the task being completed because the flashlight must be held. As a result, hands-free lighting is often used because the individual desiring illumination does not need to hold the light source. Common types of hand-free lighting include light sources mounted to headgear or eyeglasses.

Light sources on eyeglasses usually include mounting arrangements of the light source, which may be an LED, on either the cross-frame or temple of the eyeglass so as to provide illumination forwardly of the wearer. In such configuration, lighted eyeglasses are typically used to provide directed or focused light so that an area immediately forward of the wearer, e.g., 6-24 inches from their eyes, can be illuminated for tasks such as reading typical sized print. For other activities, such as walking at night, camping or emergency use, lighting areas even further ahead of the individual may be desirable. However, prior lighted glasses configured to provide hands-free lighting for some of these various purposes have often been heavy, bulky, inconvenient, and/or otherwise provide unsatisfactory performance.

Some prior lighted glasses have separate and bulky lighting modules fastened to the glasses such as disclosed in U.S. Pat. Nos. 5,541,767 to Murphy et al.; 4,959,760 to Wu; and 3,769,663 to Perl. Because of their large lighting modules, these glasses are bulky and may be fairly heavy making them inconvenient for a user to wear. Further, these prior lighted glasses conspicuously mount the lighting modules to the glasses or incorporate electronic components for the lighting therein so that the presence of the light modules or electronic components is visually prominent when the glasses are worn, giving the glasses an unsightly appearance.

Prior lighted glasses are also known where lighting components including the light and power sources and the light switch are distributed along the eyeglass frame by mounting the light source to the front cross-frame member of the glasses and then mounting the other electrical components for the light source to the temple arms. In one arrangement, wires of the electrical components are run from the power source to the light source across the pivot connections between the temple arms and the front cross-frame member, such as disclosed in U.S. Pat. Nos. 5,946,071 to Feldman and 5,722,762 to Soll. These glasses, however, can complicate the pivoting action between the temple arms and the front frame member due to the wires spanning the pivot connection between the temple arms and front, cross-frame member of the glasses. If the wires are run outside of the frame of the glasses, the glasses are provided with an unsightly appearance.

Lighted glasses are known that utilize the pivoting motion of the temple arms to turn the lights on and off so that the glasses have hinge switches, such as those as disclosed in U.S. Pat. Nos. 5,218,385 to Lii; and 4,283,127 to Rosenwinkel; and U.S. Patent Publication Nos. 2003/0189824 to Meeder et al. and 2006/0012974 to Su. The hinge switch powers the light source when the temple arms are unfolded and turns off the light source when the temple arms are folded. Typically, the hinge switch employs separate electrical contacts on the temple arm and the cross-frame member so that when the temple arms are unfolded, the contacts engage each other to provide power to the light source. In this manner, use of wires spanning the pivot connections between the temple arms and cross-frame member is avoided. However, the use of moving parts to establish an electrical connection between a power source mounted to the temple arms and a light source mounted to the cross-frame member creates reliability problems. For instance, with repeated usage and pivoting of the temple arms relative to the front cross-frame member, the tolerances therebetween can change so that the degree of engagement between the contacts changes which can cause intermittent conductance between the contacts when the temple arm members are pivoted open. Such intermittent conductance results in the lights blinking on and off. Similarly, repeated usage can cause wear of the engagement surfaces of the contacts also resulting in the blinking problem created by intermittent conductance across the contacts. In addition, if the glasses only use a hinge switch, the lights are always on when the temple arms are pivoted open and thus cannot be used as conventional, unlighted glasses. One solution is to provide another on/off switch, but this undesirably adds complexity and cost to the lighted glasses and requires additional electronics on the glasses which can contribute to an unsightly appearance.

SUMMARY

Illuminated eyewear is provided that directs light forwardly from the user when wearing the eyewear. The illuminated eyewear herein is in the form of eyeglasses, either with or without lenses, or with a lens or lenses that can be refractive or non-refractive, that in one aspect has the lights arranged so as to optimize their performance. In another aspect, the illustrated eyewear herein has electrical components for the lights arranged to provide enhanced aesthetics over prior lighted eyeglasses.

In one form, the eyewear includes a pair of temple arm members where each temple arm member has a forward and rearward end. Each temple arm member also has inner and outer surface portions that have a flat configuration and extend lengthwise between the forward and rearward ends of the respective temple arm members. The eyewear further includes a front support including, at least in part, a bridge portion that extends between the forward ends of the temple arms members. Hinge connections couple the temple arm members with the front support allowing the temple arm members to pivot relative thereto. The eyewear also includes a light source mounted to each temple arm and a plurality of thin, compact generally flat batteries, such as conventional disc-shaped coin-cell batteries, for providing power to the light sources. Peripheral shapes for the flat batteries other than circular are also contemplated such as with rechargeable coin-cell batteries that have an oblong configuration. Each temple arm member includes a narrow width battery compartment positioned between the flat inner surface portion and the flat outer surface portion of the temple arm member. The narrow width battery compartments are sized so that a pair of thin, flat batteries may be received in a non-overlapping, side-by-side arrangement with main flat surfaces of the batteries facing the flat inner and outer surface portions of the respective temple arm members. The plurality of batteries are connected to the light sources by an electrical connection to be powered thereby. Accordingly, for each temple arm member, the light source, the associated batteries, and the electrical connection therebetween are mounted to the temple member so that there are no electrical components that span the hinge connections between the temple arm members and the front support.

So configured, the illuminated eyewear has temple arm members that maintain a narrow width while at the same time also include all of the lighting components in the temple arm members. This configuration of eyewear that mounts the light source, batteries, and the electrical connection therebetween all in the respective temple arm members avoids the unsatisfactory performance issues associated with prior hinge switches because electrical power is not routed through or otherwise reliant on operation of a hinge. Moreover, by employing a narrow width battery compartment between the inner and outer surface of the temple arm members to receive the pair of thin, flat batteries in a non-overlapping and side-by-side arrangement, the eyewear, and in particular, the temple arm members, retain an appearance as they would with traditional eyeglasses. The narrow battery compartment and side-by-side arrangement of the thin, flat batteries eliminates bulky and unsightly modules and large bulges in the eyeglass frame to house batteries such as with conventional, generally cylindrical flashlight batteries and avoids the unsightly appearance this arrangement creates as can be seen in the prior lighted glasses such as shown in U.S. Pat. No. 2,638,532 to Brady.

In another form, the eyewear includes a front support including, at least in part, a bridge portion that generally extends laterally along a lateral axis. The eyewear further includes a pair of temple arm members and a hinge connection between each of the temple arm members and the front support. So configured, the temple arm members are pivotal between a use configuration with the temple arm members extending rearwardly from the front support along respective fore-and-aft axes that are generally orthogonal to the lateral axis, and a storage configuration with the temple arm members generally extending laterally adjacent to the front support along the lateral axis. Adjacent to each of the hinge connections are a front frame portion and a light source. Each front frame portion includes a blinder surface adjacent the light source and at a laterally inward location therefrom. The binder surface extends transversely to the lateral axis, and preferably at a laterally inward cant obliquely to the lateral axis to be inclined relative thereto.

So configured, the blinder surfaces minimize incident light from the light sources from causing glare when the temple arms are pivoted to the use configuration and the illuminated eyewear is worn with the lights on.

In a preferred form, the light sources are LEDs that have a predetermined light cone such as 40 degree LEDs, and the preferred canted blinder surfaces are inclined to the lateral axis in a manner to avoid significant interference with the cones of light generated by the LEDs while blocking incident light outside the light cones from reaching the eyes of the wearer of the lighted eyeglasses. Most preferably, the inclination of the blinder surfaces is substantially matched to the angle of the light cone so that only incident light from the LEDs is blocked by the blinder surfaces.

In another aspect, the illuminated eyewear has a cross-frame member that includes the front frame portions so that the blinder surfaces are integrated in the cross-frame member. The front frame portions are at lateral ends of the cross-frame member and extend laterally and rearwardly to the pivot connections with the temple arm members at their forward ends, at which the LEDs are mounted. Thus, when the temple arm members are pivoted to their use configuration, this pivots the LEDs to be adjacent a rear portion of the inclined blinder surfaces integrated into the cross-frame member. In a preferred form, the blinder surfaces each can be formed as a generally semi-frustoconical surface so that a notch opening is formed at the rearward end of the semi-frustoconical surface into which the LED is pivoted when the temple arm members are pivoted open to their use configuration.

In yet another form, the illuminated eyewear includes a pair of temple arm members with each temple arm member having forward and rearward ends, and a front support including, at least in part, a bridge portion that extends laterally between the forward ends of the temple arm members. A hinge is provided between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off. Each temple arm member also includes a laterally inner surface portion that generally faces laterally inwardly toward the other laterally inner surface portion when the temple arm members are shifted to the open configuration. Each laterally inner surface portion includes a recessed cavity sized to receive the power source and the switch therein such that the presence of the power source and the switch is substantially hidden from view.

By providing the cavity for the power source and switch recessed into the laterally inner surface portion of the temple arm member, the illuminated eyewear in this form has an appearance more similar to conventional non-illuminated eyewear. For example, prior lighted eyeglasses commonly have light modules mounted to an outer surface of eyeglass temple arms facing laterally outward therefrom. Configured this way, the light module projects outwardly from the laterally outer facing surface, making the eyewear significantly wider and prominently displaying the module so it can be readily seen when the lighted eyeglasses are worn. Likewise, prior lighted eyeglasses with a battery compartment recessed into the outer surfaces of the temple arms expose the battery compartment cover so that it is readily visible when the eyeglasses are worn. These conspicuous displays of lighting components in prior lighted eyeglasses detract from the aesthetics and appearance of the eyewear. The illuminated eyewear of this form, on the other hand, has all of the lighting components mounted to the temple arm members and concealed therein in a manner so that it is not immediately apparent that the illumination components are present on the glasses. More specifically, by recessing the compartment for the power source and switch in the inner surface portion of the temple arm, the lighted eyewear herein can appear to be substantially similar to conventional eyeglasses when being worn.

In yet another form, the illuminated eyewear includes a pair of temple arm portions, each having rear end portions configured to rest on a user's ears and opposite forward end portions. The illuminated eyewear further includes a front support portion that includes opposite end portions and an intermediate bridge portion configured to rest on a user's nose. Pivot or hinge connections are positioned between the forward end portions of the temple arm portions and the opposite end portions of the front support portion. So configured, the temple arm portions and the front support portion have a use configuration where the front support portion generally extends along a lateral axis and the temple arm portions extend along longitudinal axes that are generally orthogonal to the lateral axis. A light source is mounted adjacent to each of the pivot connections so as to be canted laterally inwardly from the respective longitudinal axis of the temple arm portion and downwardly from the front support portion to provide forward illumination inwardly and downwardly therefrom. The illuminated eyewear also includes a pair of thin, generally flat batteries for each light source. A portion of each temple arm portion is enlarged in at least two directions orthogonal to each other and orthogonal to the longitudinal axis. Each temple arm enlarged portion has a battery compartment for fitting the pair of batteries in a stacked, overlapping orientation therein.

In this form of the illuminated eyewear, the inward and downward cant of the light source advantageously provides an overlap between the light beams projected by the light sources that is focused forwardly of the wearer in their field of view. Thus, the wearer does not need to tilt or shift their head to align the light sources or orient the illumination to focus the light beams within the wearer's field of view.

BRIEF DESCRIPTION OF THE DRAWINGS

FIG. 7 is an enlarged, exploded view of a portion of the temple arm member of FIG. 6 showing a battery compartment recessed in an inner surface of the temple arm member;

FIG. 12A is a side elevational view of illuminated eyewear in accordance with the present invention showing one of the temple arms in an extended position and a light module attached to the arm;

FIG. 12B is a side elevational view of the illuminated eyewear of FIG. 12A showing the arm in a retracted position;

FIG. 13A is a side elevational view of alternative, illuminated eyewear in accordance with the present invention showing one of the temple arms in an extended position and a light module attached to the arm;

FIG. 13B is a side elevational view of the illuminated eyewear of FIG. 13A showing the arm in a retracted position;

FIG. 13C is an enlarged, fragmentary view of the temple arms of FIGS. 12A, 12B, 13A, and 13B showing a releasable locking structure between forward and rearward segments of the arm;

FIG. 14 is a plan view of the illuminated eyewear of FIG. 12 showing both of the temple arms and a cross-frame member extending between the forward ends of the arms in an extended position;

FIG. 15A is a plan view of the illuminated eyewear of FIGS. 12A and 12B showing both the temple arms and the cross-frame member in their retracted positions;

FIG. 15B is a plan view of the illuminated eyewear of FIGS. 13A and 13B showing both the temple arms and cross-frame member in their retracted positions;

FIGS. 16-23 are plan and side elevational views of alternative temple portions for illuminated eyewear having integrated power sources and LEDs;

FIG. 24 is a plan view of the illuminated eyewear and a battery charger for recharging the integrated power source of the temple arms;

FIG. 26 is a perspective view of a LED embodying features of the present invention showing a lens and pair of lead surrounded by a protective covering;

FIG. 27 is a cross-sectional view of the LED in FIG. 26 generally taken along lines 50-50 showing the protective covering surrounding the LED;

FIG. 28 is a cross-sectional view of the LED in FIG. 26 generally taken along lines 51-51 showing the protective covering surrounding the LED lens; and FIG. 29 is a cross-sectional view of the LED in FIG. 26 generally taken along lines 52-52 showing the protective covering surrounding the LED leads;

DETAILED DESCRIPTION OF THE PREFERRED EMBODIMENTS

Figure 1:
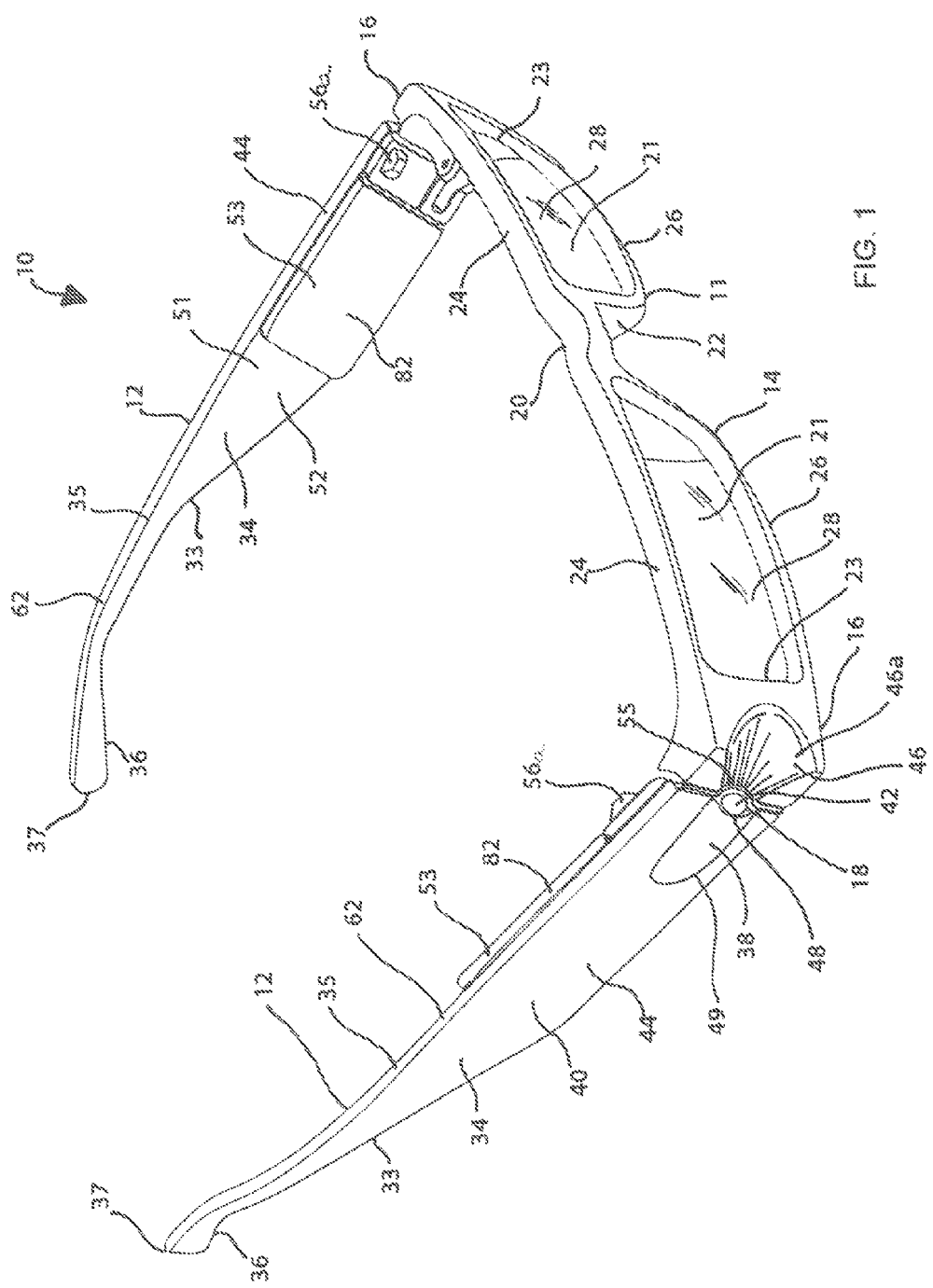
FIG. 1 is a perspective view of illuminated eyewear showing temple arm members in a pivoted open configuration relative to a cross-frame member with an LED light source on each temple arm disposed adjacent respective blinder portions of the cross-frame member.

In general and as further described below, illuminated eyewear, which may or may not include a lens or lenses 21 attached thereto, is provided to provide lighting forwardly of the wearer. The illuminated eyewear 10 can be configured to have a typical eyeglass frame 11 with a plurality of generally rigid frame members including a pair of spaced temple arm members 12 and a front cross-frame member 14 extending laterally between the temple arm members 12. As illustrated, the temple arm members 12 are pivotally connected to the cross-member 14 via hinges 30 at the juncture between laterally opposite end portions 16 of the cross-frame member 14 and front end portions 44 of the temple arm members 12.

Other constructions for the frame 11 of the lighted eyewear 10 are also contemplated including those where the cross-frame member 14 is modified to include several components or parts or where these parts are substantially reduced or even eliminated such as by only including an intermediate bridge portion or member 20 connected at either end thereof to lenses 21. The cross-member 14 can also have the laterally outer, front frame end portions 16 connected only to the laterally outward portions of the lenses 21 with these outer frame portions 16 being separate from the intermediate bridge portion 20 so that the cross-frame member 14 includes multiple parts. Alternatively, only a single lens 21 may be provided extending between and pivotally connected to the forward end portions 44 of the temple arm members 12 with the bridge portion 20 integrated into the lens 21 so that lens 21 constitutes part of the eyeglass frame. The lenses 21 themselves may be either refractive to provide vision correction or non-refractive to only provide a transparent shield for protection, as with safety glasses. Manifestly, the lens or lenses 21 need not be provided as the eyeglass frame could be used only to provide for hands-free lighting. Herein, the term front support contemplates all these and other constructions for the single or multiple part cross-frame member with or without lenses where the front support is used to support the front portion of the lighted eyeglasses herein on a person wearing the lighted eyeglasses.

The frame 11 of the illuminated eyeglasses 10 could also be one integral piece, with or without lens or lenses 21, with the hinges or hinge connections 30 between the temple arm and cross-frame or front support portions being in the form of living hinges. In this regard, the hinges would be portions of the frame 11 that are resiliently flexible such as by being reduced in their cross-sectional thickness over adjacent frame portions to allow the temple arm portions 12 to be resiliently folded to a substantially closed position adjacent the front support to provide a compact storage configuration for fitting in an eyeglass case for example, with the temple arm portions 12 resiliently returning to their use configuration extending generally rearwardly from the front support when the eyeglasses 10 are removed from the storage case.

The illuminated eyewear 10 preferably has at least a pair of light sources 18 mounted thereto to provide lighting forwardly of a wearer. The light sources 18 are preferably light emitting diodes (LEDs), but other suitable electroluminescent lamps, suitable incandescent lamps, gas discharge lamps, high-intensity discharge lamps, or any other suitable light source, such as a laser diode, can be utilized.

Referring to FIGS. 1-8, one form of exemplary illuminated eyewear 10 is illustrated in more detail. As mentioned above, the front-support or cross-frame member 14 includes the intermediate bridge portion 20 intermediate of the end portions 16. The bridge portion 20 is configured to allow the cross-frame member 14 to rest on and be supported by the bridge of a wearer's nose. The bridge portion 20 includes downwardly and rearwardly extending side rests 22 configured to engage the sides of the wearer's nose. As illustrated, the bridge portion 20 is a portion of the illustrated integral, one-piece cross-frame member 14 and has a truncated generally triangular shape, however, the bridge portion 20 could alternatively include other configurations, such as employing adjustable pads attached to the cross-frame member 14 configured to contact and rest upon the sides of the wearer's nose instead of the side rests 22 and frame configuration.

In the illustrated form, the cross-frame member 14 of the illuminated eyewear 10 includes an upper frame portion 24 and a lower frame portion 26 extending from both sides of the bridge portion 20 to the end portions 16 thereof. However, the front support may also include a frameless construction or have only either the upper frame portion 24 or the lower frame portion 26. In another approach, the front support 14 consists of the bridge portion 20 attached directly to lenses, which then can attach directly to the temple arm members 12 or can have an intermediate frame part or portion pivotally coupling the lenses to the temple arm members 12. Other configurations for the front support could also be employed, as has been previously discussed.

Figure 3:
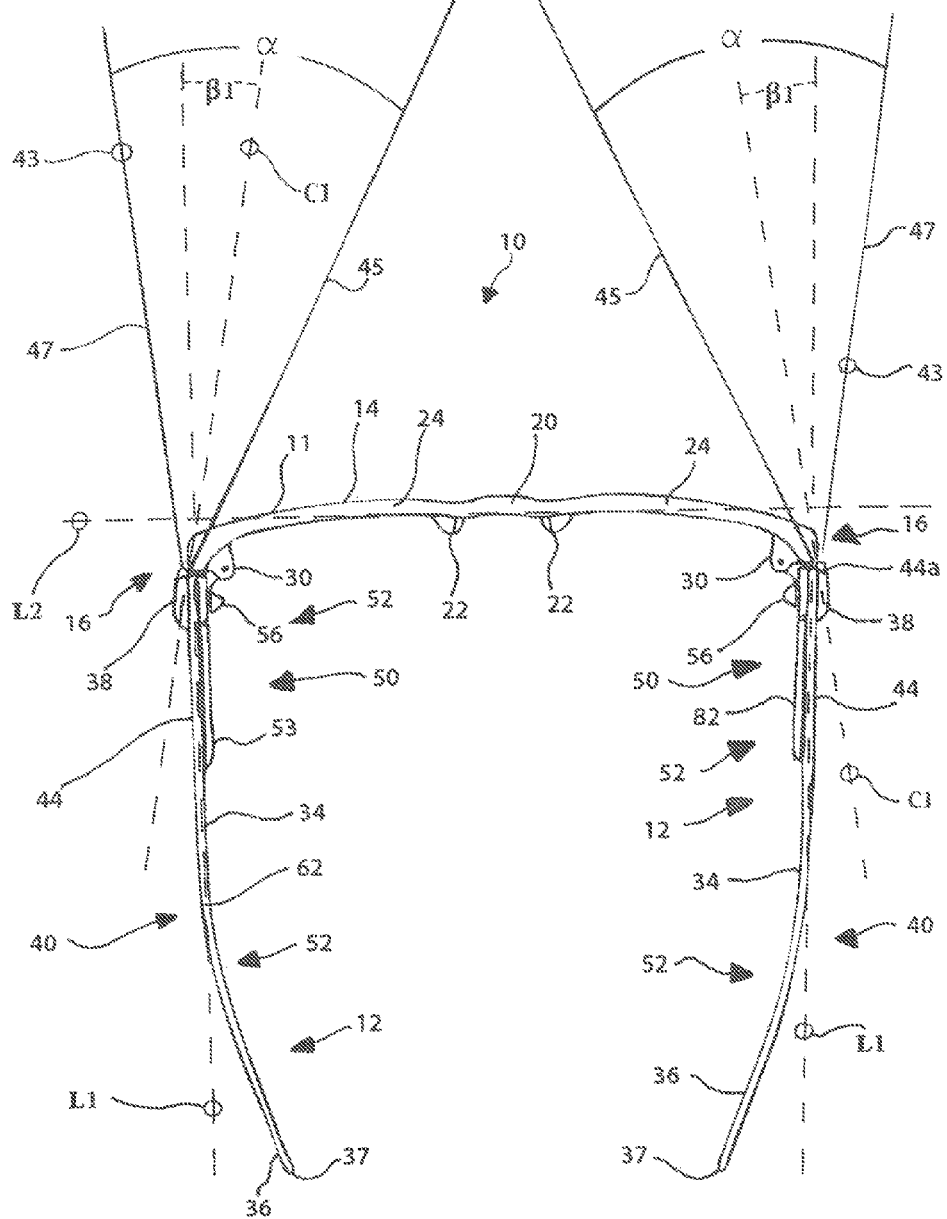
FIG. 3 is a plan view of the illuminated eyewear showing the LED light sources being canted laterally inward so that the axes of light cones projected therefrom are canted laterally inward toward each other.

The end portions 16 can have a generally arcuate configuration to extend laterally from the laterally outer portions of the lenses 23 and rearwardly to be pivotably connected to the temple arm members 12, as can be seen in FIGS. 1 and 3. As illustrated, the upper frame member portion 24 and the lower frame member portion 26 form lens openings 28 in which the lenses 21 are fit. The lens openings 28 are configured to support a variety of eyeglass lens types. For example, the lens openings 28 may be used to support lenses used for safety glasses, sunglasses, prescription glasses, other protective eyewear, or any suitable combination thereof. Alternatively, the lens openings 28 can be left empty and/or the cross-frame member 14 can be formed without the lower frame member portion 26.

The forward end portions 44 of the temple arm members 12 are pivotally connected to the end portions 16 of the cross-frame member 14 by the hinges 30 to form pivot connections therebetween to allow the temple arm members 12 to pivot relative thereto. When pivoted to an open or use configuration as shown in FIG. 1, the temple arm members 12 extend generally rearwardly from the cross-frame member 14 along fore-and-aft axes L1 that are generally orthogonal to a lateral axis L2 along which the cross-frame member 14 generally extends. The temple arm members 12 are also configured to pivot or shift to a collapsed, closed, or storage configuration with each temple arm member 12 generally extending laterally along the L2 axis adjacent to the cross-frame member 14. As can be seen in FIG. 3, both the temple arm members 12 and the cross-frame member 14 have curvatures such that they do not extend linearly along their respective axes L1 and L2 but rather more generally therealong, as described above.

As discussed above, the temple arm members 12 are pivotally connected to the cross-member 14 via the hinges 30 at the juncture between the laterally opposite end portions 16 of the cross-frame member 14 and the forward end portions 44 of the temple arm members 12. In the illustrated form, the forward end portions 44 of the temple arm members 12 are thicker in the lateral direction than the remainder of the temple arm members 12 extending rearwardly therefrom. The forward end portions 44 of each of the temple arm members 12 are enlarged in two directions that are orthogonal to each other and orthogonal to the longitudinal axis L1 of the temple arm members 12. As shown, the temple arm members 12 are relatively thin even with the thicker forward end portions 44 which are approximately twice as thick as the remainder of the temple arms. As discussed hereinafter, the thicker forward portions 44 are configured to house electrical components that are operable to selectively provide electrical power to the LEDs 18.

More particularly, the temple arm members 12 extend rearwardly from the forward portion 44 to an intermediate portion 34 configured to rest on and be supported by the ears of the wearer. The intermediate portion 34 has a bottom edge 33 that tapers up toward the top edge 35 of the temple arm members 12 to reduce the height thereof for properly fitting on the ears of the wearer. The temple arm members 12 terminate with a distal portion 36 that extends laterally inwardly and downwardly as it extends rearwardly from the intermediate portion 34 to rearward ends 37 of the temple arm members 12. So configured, the temple arm members 12 generally follow the contour of the wearer's head from adjacent the eyes to a position behind the ears. Alternatively, the distal portions 36 need not extend downwardly and the intermediate portion 34 of the temple arm members 12 need not rest on a wearer's ears instead gripping on the side of the wearer's head as is known.

As discussed above, the intermediate portion 34 and the distal portion 36 are thinner in the lateral direction than the forward portion 44 of the temple arm members 12. However, even with the enlarged forward portion 44, the thickness of the temple arm members 12 are very thin such that they have a generally flat configuration akin to temple arm members commonly provided with traditional non-lighted eyeglasses. By way of example and not limitation, the lateral thickness of the intermediate and distal portions of the temple arm members 12 can be approximately 3 mm, and the lateral thickness of the forward portion 44 can be approximately 5 mm. Configurations other than generally flat could also be employed for the temple arm members 12 such as by including both flat and curved portions or only curved portions of the temple arm members 12. For instance, the temple arm members 12 could also have a small diameter, cylindrical configuration.

Figure 5:
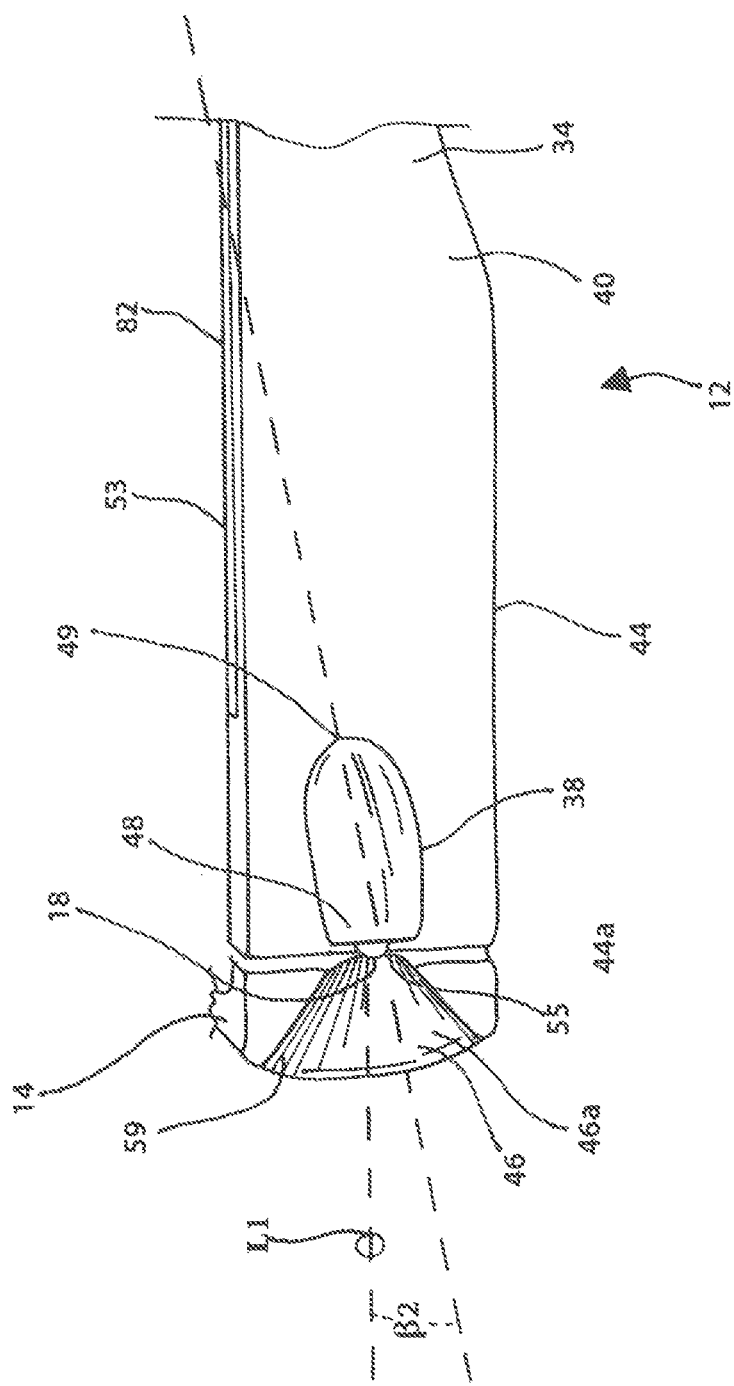
FIG. 5 is an elevational view showing one of the temple arm members including an integral tubular LED holder that directs the light cone downwardly.

The light sources 18, which may be small LEDs, are preferably mounted to the forward end portions 44 of the temple arm members 12. By one approach, each light source 18 is mounted at least partially within a projection or tubular portion 38 extending slightly outwardly from outer surface portion 40 of each temple arm member 12. The outer surface portion 40 preferably has a flat configuration but for the tubular portion 38 projecting therefrom, with the tubular portion 38 providing a partially outward positioning of the light source 18 relative to the flat outer surface 40 of the temple arm to position the light for forward illumination. At the same time, the projecting tubular portion 38 has a small radius of curvature such as on the order of approximately 2 mm that substantially conforms to that of the cylindrical portion of lens 42 of the LED 18, which is effective to avoid the size and weight increase associated with prior lighted eyeglasses having light modules on their temple arms. Preferably, the tubular portions 38 are formed at the forward end portions 44 of the temple arm members 12 in the middle region along the outer surface portion 40 between the upper and lower edges 62 and 64 of the temple arm members 12, as best seen in FIG. 5.

A forward lens 42 of the LED light source 18 is generally aligned with or extends slightly forwardly of the forwardmost end 44a of each of the temple arm members 12. In addition, the LED element that generates light similarly is generally aligned with the temple arm member forwardmost end 44a. By this positioning, no portion of the temple arm member 12 interferes with the light cone emitted by the LED 18. Positioning the LED element and lens 42 even with or forwardly of the forwardmost end 44a of the temple arm member 12, however, still can undesirably generate glare from incident light outside the light cone of the LED 18 since the LEDs 18 are still recessed back from the forward portions of the cross-frame member 14, and in particular the lenses 21 thereof. For instance, such incident light that reaches the lenses 21 may be refracted or reflected into the wearer's eyes or the incident light may simply be an annoyance and distraction to the wearer by being within the wearer's peripheral vision. In the illustrated form, the illuminated eyewear 10 minimizes these issues by positioning the LEDs 18 adjacent the outer surface portions 40 of the temple arm members 12, as discussed above.

Figure 4:
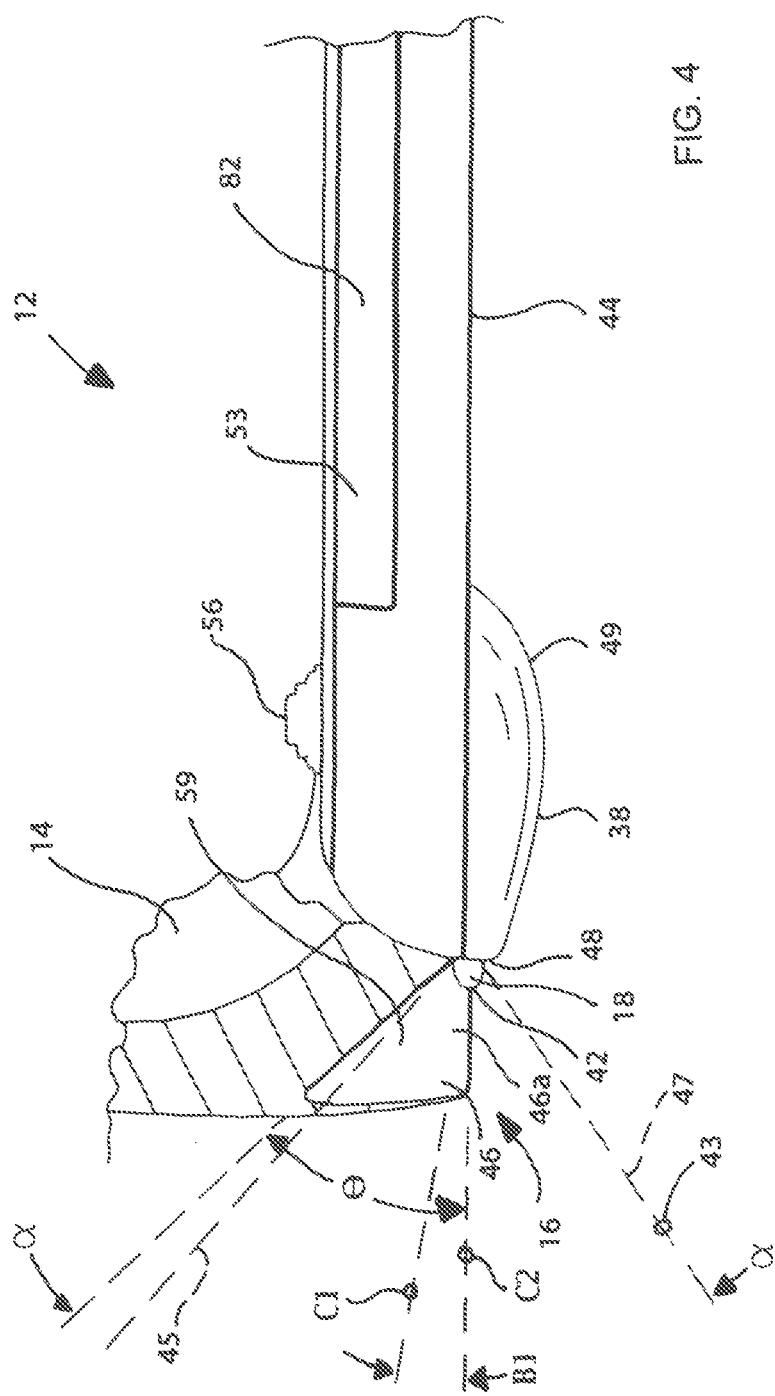
FIG. 4 is an enlarged fragmentary plan view partially in section showing an inclined surface of the blinder portion having an inclination substantially aligned with that of the inner edge of the light cone.

As is understood, the LEDs 18, emit a conical beam of light. In this regard, the light cone 43 generally has the illustrated laterally outward opposite side edges 45, 47 that taper away from each other from the vertex or the LED element in the LED lens 42 so that the cone 43 has a predetermined angle or degree of spread α between the opposite edges thereof. For example, this light cone angle α may be between about 20 degrees and about 40 degrees. A light cone center axis or centerline C1 extending forwardly from the LED element divides the light cone 43 in half with equal angles between the axis C1 and each of the illustrated, opposite light cone edges 45, 47. In order to orient the light sources 18 to emit such cones 43 of light to maximize the amount of light in the viewing or reading area forrwardly of a wearer (e.g., preferably about 6 to 24 inches in front of the wearer), the LEDs 18 can be canted laterally inwardly toward each other as shown in FIG. 4 and downwardly relative to the temple arm members 12 and the fore-and-aft temple axes L1, as shown in FIG. 5. Referencing FIGS. 3 and 4, the LEDs 18, and more particularly the light cones 43 emitted therefrom, are canted laterally inward so that the center axis C1 of the cones extend transversely to the temple axis L1, at an angle β1 from the temple axis L1 so that the light cones intersect closer forwardly of the cross-frame member 14 than if the cone axes C1 and fore-and-aft temple axes L1 were substantially coincident.

More particularly, the tubular portions 38 are configured so that they taper in the forward direction toward the outer surface portion 40 of the temple arm members 12 so that the LEDs 18 mounted therein have the desired inward cant, as shown in FIG. 4. With the LEDs 18 canted inwardly, the inner edges 45 of the light cones 43 will intersect each other at the beginning of the reading or viewing distance of the wearer, such as 6 inches forwardly of the lenses 21, without requiring LEDs having wider light cones. As shown in FIG. 5, the tubular LED mounting portions 38 can also be configured to extend forwardly and slightly downwardly with the forward portion 48 slightly lower than the rearward portion 49 so that the LEDs 18 mounted therein are also oriented to extend forwardly and slightly downwardly with the central axis C1 of the light cones 43 being canted downwardly at an angle β2 to the temple fore-and-aft axis L1. In this manner, the light cones 43 emitted from the LEDs 18 are also canted in a downward direction relative to the temple arm members 12 and the cross-frame member 14.

As previously mentioned and as can be seen in FIG. 3, the LEDs 18 are disposed adjacent to the end portions 16 of the cross-frame member 14 so as to be recessed rearwardly with respect to the lenses 21 that also curve slightly forwardly since they are held by the cross-frame member 14 that has a slight forward curvature. As a result of this arrangement and as previously discussed, incident light and glare caused thereby can be a problem. To avoid this, the eyeglass frame 11 and preferably the front support thereof can include blinder portions 46 laterally inward from the adjacent light sources or LEDs 18 so that the blinder portions 46 are arranged and configured to keep incident light from reaching the eyes of the eyeglass wearer. More specifically, the blinder portions 46 each include a blinder surface 46a that extends forwardly alongside the LEDs 18 transversely to the lateral axis L2. The blinder surfaces 46a can extend orthogonal to the lateral axis L2. However, this configuration of the blinder surfaces 46a can interfere with the light cones 43 emitted by the LEDs 18. In other words, with adjacent blinder surfaces 46a that extend orthogonal to axis L2 and parallel to the fore-and aft axes L1, the inner edges 45 of the light cones 43 can intersect the blinder surfaces 46a.

Accordingly, in the illustrated and preferred form, the lighted eyeglasses 10 avoid substantial interference with the light cones 43 by having the blinder portion 46 configured so that the blinder surface 46a is inclined to extend at a laterally inward cant obliquely relative to the lateral axis L2, as will be described further hereinafter. In this manner, the blinder surfaces 46a extend in the same general direction as the inner edge 45 of the corresponding light cone 43 so as to minimize interference therewith thus maximizing the amount of light from the LEDs 18 that is utilized to illuminate the viewing area for the wearer of the eyeglasses 10.

Figure 2:
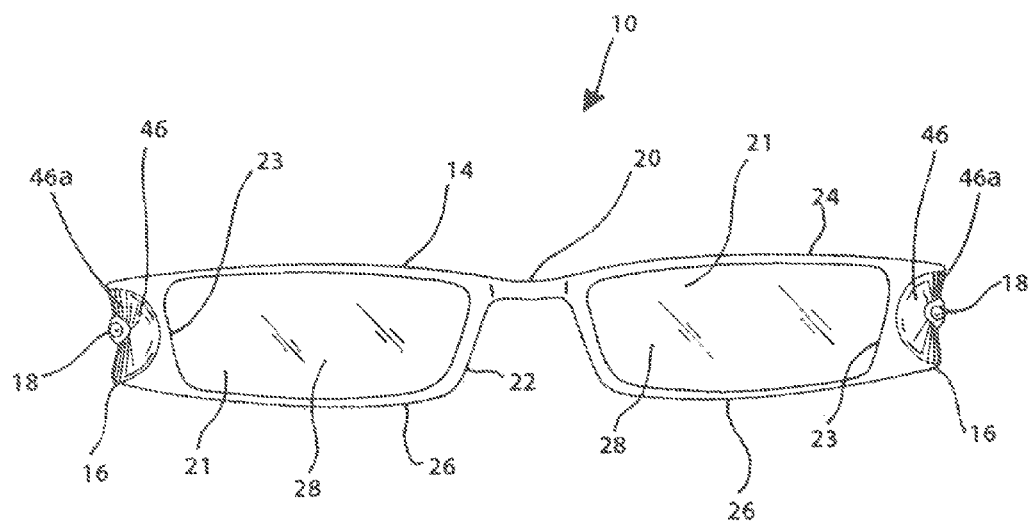
FIG. 2 is a front elevational view of the illuminated eyewear showing both of the LED light sources adjacent corresponding blinder portions of the front, cross-frame member.

More particularly, the blinder portions 46 are preferably formed in the outer end portions 16 of the cross-frame member 14 and each have a blinder surface 46a with a generally semi-frustoconical configuration. In this regard, the semi-frustoconical blinder surfaces 46a can be constructed from a reference right cone with the surfaces 46a truncated so that the vertex of the reference cone is generally positioned where the corresponding LEDs 18 are located when the temple arm members 12 are pivoted to their open position. The truncated reference cone along which the blinder surfaces 46a each extend is generally divided in half so that the blinder surfaces 46a open laterally outward and have a bottom notch opening 55 sized to fit the LEDs 18, and specifically the laterally inner half of the LED lenses 42, therein when the temple arms 12 are pivoted open, as seen in FIGS. 2 and 4. In this manner, each of the LEDs 18 is substantially oriented at the vertex of the reference cones of its adjacent blinder portion 46 when the lighted eyeglasses 10 are in their use configuration. As is apparent from the above, the blinder portions 46 are positioned adjacent to the LEDs 18 and generally laterally inward from the LEDs 18 and extend at a laterally inward incline generally forwardly from the LEDs 18. So configured, when the temple arm members 12 are pivoted to the use configuration, the lenses 42 of the LEDs 18 are positioned laterally adjacent to the blinder portions 46.

As illustrated in FIG. 4, the reference cone along which the blinder portion surfaces 46a extend has a conical angle or opening angle θ that is substantially equal to or slightly larger than the light cone α emitted by the light source 18. Additionally, the blinder portion surface 46a can be canted in the same manner as the light cones 43 from LEDs 18 so that the surfaces 46a generally extend along the laterally inner edge 45 of the light cones 43 or preferably tapering slightly away therefrom so as to generally avoid interfering with or intersecting the light cones 43. To this end, the central axis C2 of each of the reference cones along which the blinder surfaces 46a extend is substantially coincident with the canted central axis C1 of the light cones of the LEDs 18. In this manner, the amount of light from the preferred canted LEDs 18 that reaches the viewing area is maximized while incidental light outside the light cones is blocked from reaching the eyes of the wearer of the lighted eyeglasses 10.

By another approach, the blinder portions 46 could be incorporated in the temple arm members 12 rather than in the end portions 16 of the cross-frame member 14. In this form, the temple arm members 12 would include both the light sources 18 and the blinder portions 46. Accordingly, in this approach, the temple arm members 12, and specifically the blinder portions 46 thereof, would be pivotably connected to the cross-frame member 14.

As described earlier, the LEDs 18 can be mounted to the temple arm members 12, and specifically partially within the tubular portions 38, to project their light cones at the angle β2 downward with respect to the longitudinal axis L1 of the temple arm members 12. By way of example and not limitation, the angle β2 can be in the range of about 2 degrees to about 10 degrees and preferably about 3 degrees to about 5 degrees from the longitudinal axis L1 of the temple arm members 12. In addition, the LEDs 18 can also be housed within the temple arm members 12, and specifically the tubular portions 38, to project their light cones 43 at the laterally inwardly canted angle β1 relative to the longitudinal axes L1 which can be in the range of about 2 degrees to about 10 degrees and preferably about 3 degrees to about 5 degrees. Accordingly, in the illustrated and preferred form, the LEDs 18 are canted both inwardly and downwardly relative to the L1 axis. As such, in the illustrated form, the tubular members 38 are also inclined or canted relative to the temple arm members 12 and the flat temple outer surface portion 40, as previously described. For instance, distal end portion 49 of the tubular portion 38 extends further from the outer surface portion 40 of the temple arm member 12 with the tubular portion 38 generally being inclined toward the outer surface portion 40 as the tubular portion 38 extends forwardly along the temple arm member 12 to the forward end 48 thereof. This configuration generates the inwardly directed cant β1 of the light source 18 while also positioning the lens 42 of the LED 18 adjacent the blinder portions 46 when the temple arm members 12 are in the use configuration. The LEDs 18, however, can be canted inward or downward at different angles to direct the light emitted by the LEDs 18 to other areas forwardly of the wearer. If desired, the LEDs 18 may also be adjustable so that the cant of the LEDs 18 can be user selected.

Similarly, the blinder portions 46 can be configured to substantially match the orientation of the light cones 43 emitted from the LEDs 18 with the lighted eyeglasses 10 in the use configuration. For this purpose and as previously described, the central axis C2 of the reference cones along which the semi-frustoconical blinder surfaces 46a extend may also extend at a laterally inward and downward cant similar to the cants β1 and β2 of the light cones 43 of the LEDs 18. For example and as illustrated in FIG. 4, central axes C2 of the blinder portions 46 is canted approximately the same degree inwardly and/or downwardly as the central axes C1 of the light cones 43 of the LEDs 18 relative to the temple arm axes L1 with the temple arm members 12 pivoted to their open configuration. In addition, the incline or cant of the laterally innermost edge 59 of the semi-frustoconical blinder surface 46a of the blinder portion 46 is preferably the same as or slightly greater than the corresponding laterally innermost edge of the cone of light emitted from the LED 18; thus, the blinder portions 46 do not interfere with, constrict, or alter the shape of the light cones emitted by the LEDs 18. By one approach, the conical or opening angle θ of the reference cones for the blinder portions 46 is about 2 degrees to about 5 degrees wider than the corresponding angle α of the LED light cones. For example, if the cone of light has a conical angle of about 10 degrees to about 40 degrees total or about 5 degrees to about 20 degrees on either side of the light source centerline C1, then the conical angle θ for the blinder surface 46a can range from about 10 degrees to about 15 degrees on either side of the axis C2 for a 20 degree light cone up to about 20 degrees to about 25 degrees on either side of the axis C2 for a 40 degree light cone.

As shown and described above, only the tubular portion 38 projects laterally beyond the outer surface portion 40 of the temple arm members 12. Accordingly, there are no electrical components, access openings, coverings, or the like, mounted to or formed in the outer surface portion 40 of the temple arm members 12. Similarly, the cross-frame member 14 has a substantially typical and ordinary eyeglass appearance, except for the inclusion of the blinder portions 46. This configuration provides the illuminated eyewear 10 with visible surfaces that are similar to non-lighted eyeglasses and frames thereof, which creates a pleasing aesthetic, while also keeping the light sources 18 from shining into the eyes of the wearer or being in the peripheral vision of the wearer.

Figure 6:
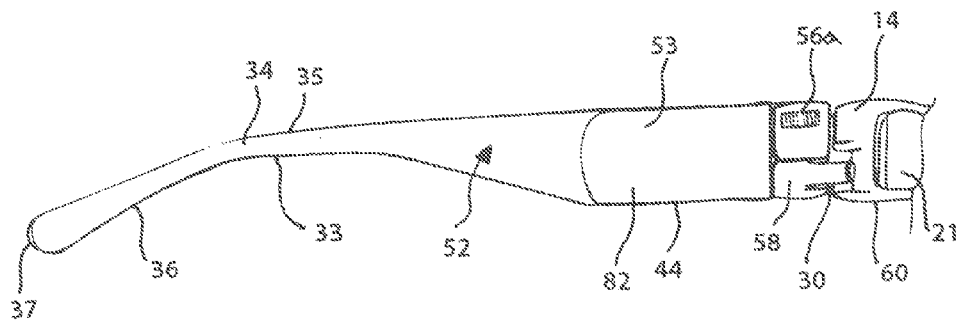
FIG. 6 is an elevated view of one of the temple arm members showing a battery compartment cover and a light switch actuator adjacent thereto.
Figure 8:
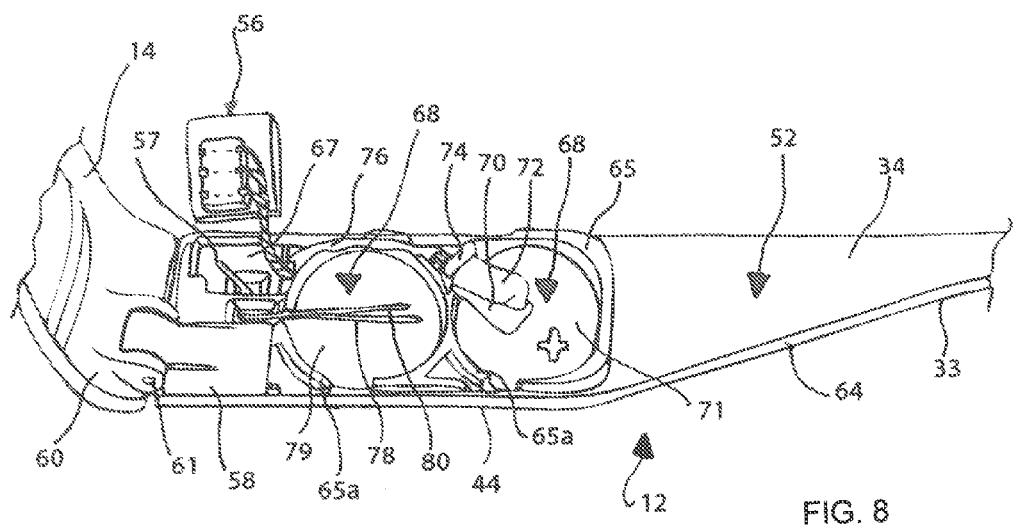
FIG. 8 is an enlarged view of the other temple arm member showing a switch compartment adjacent the battery compartment.

Referring now to FIGS. 6-8, an electrical system 50 is operable to provide power to the LEDs 18. In order to preserve the outwardly visible aesthetics of the illuminated eyewear 10, as described above, the components of the electrical system 50 are either positioned on or accessible through an inner surface portion 52 of each temple arm member 12. Positioning the electrical system components at the inner surface portion 52 effectively hides them from view while the illuminated eyewear 10 is worn. The inner surface portions 52 can have a substantially flat configuration and are arranged so as to face each other when the temple arm members 12 are shifted to the open configuration. In the illustrated form, the inner surface portion 52 includes offset portions 51 and 53 with portion 53 being slightly raised relative to adjacent portion 51. The slightly raised portion 53 is preferably adjacent the cross-frame member 14 so as to correspond to the previously described laterally thicker, forward end portions 44 of the temple arm members 12, but can also be positioned in the intermediate portion 34 or the distal portion 36 of the temple arm member 12. Preferably, the majority of the components of the electrical system 50 are disposed between the inner surface portion 52 and the outer surface portion 40 of the enlarged end portion 44 of the temple 12. So configured, no components of the electronic assembly 50 are visible on the outer surface portion 40 of the temple arm members 12, no components of the electronic assembly 50 are in the cross-frame member 14, and no components of the electronic assembly 50 span the hinge 30.

In the preferred and illustrated form, a compartment 54 is recessed in the inner surface portion 53 for housing components of the electrical system 50. The electrical system components can include a switch or switch device 56, a power source 66, and the electrical connections thereof. As illustrated, the switch device 56 is a slide switch for turning the LEDs on and off, however, other types of switches can be utilized, such as a toggle, a pushbutton, or a touch switch. A rotary switch could also be utilized which could be used to control the power level supplied to the LEDs to provide a dimmer switch function. As shown in FIG. 8, the switch device 56 is connected to one of the LED contacts or leads 57 and also to the power source 66.

Preferably, the switch device 56 is mounted to the temple inner surface portion 52 adjacent to the hinge 30. In particular, the hinge 30 pivotably connects a front temple hinge part 58 to an outer or edge cross-frame member hinge part 60 with a pivot pin 61. In order to preserve space and minimize the length of the space taken up by the electrical system 50 along the temple arm members 12, the switch 56, and particularly the slide actuator 56a thereof is preferably disposed in vertical, overlying relation with the temple hinge part 58 of the hinge 30. As can be seen in FIGS. 6-8, the switch actuator 56a is positioned above the hinge 30 adjacent the end surface 44 of the temple arm member 12 and adjacent an upper surface 62 of the temple arm member 12. Accordingly, the temple part 58 of the hinge 30 is adjacent a lower surface 64 of the temple arm member 12. So configured, the switch actuator 56a is positioned to be manipulated by an index finger of the wearer to control power to the light sources 18. Alternatively, the switch 56 can be positioned adjacent the lower surface 64 of the temple arm member 12 and the temple part 58 of the hinge 30 can be positioned above the switch actuator 56a and adjacent the upper surface 62 of the temple arm member 12.

The power source compartment 54 is configured to have a narrow width to keep the lateral thickness of the temple arm members 12, and specifically the forward end portions 44 to a minimum, as previously discussed. The compartment 54 is formed between the inner surface portion 52 and the outer surface portion 40. This narrow width compartment 54 enables the temple arm members 12 to maintain a relatively thin shape, which can provide a more comfortable fit on a wearer's head than thicker temple arm members. The power source compartment 54 is further positioned adjacent to the temple part 58 of the hinge 30 and can be partially recessed into the temple arm member 12. In the illustrated form, the compartment 54 includes upstanding wall portions 65, which project away from the offset inner surface portion 51 to space the raised inner surface portion 53 therefrom. The wall portions 65 are sized and configured to provide the compartment 54 with a depth sufficient to house a substantially flat battery, such as a disc-shaped coin cell battery 66. Preferably, there are at least a pair of batteries to power the LEDs 18, such as a pair of disc-shaped coin cell batteries 66, in a longitudinal and non-overlapping, side-by-side relation, so that main flat surfaces 66a, 66b of the batteries 66 face the flat inner surface portion 52 and the flat outer surface portion 40 of the temple arm members 12. The wall portions 65 include curved wall portions 65a for forming subcompartments 68 that provide the coin cell batteries 66 with a snug fit therein. The compartment 54 can further be divided to include subcompartment 67 sized to partially receive the switch device 56, such as lower electrical components of switch device 56 that electrically couple to the batteries 66 and the LED 18. The switch subcompartment 67 has a generally small, square configuration and is adjacent one side of the upper portion of the forwardmost battery subcompartment 68. So configured, the power source compartment 54 substantially hides the batteries 66 and the switch device 56 from view when the illuminated eyewear 10 is worn.

When the batteries 66 are in the longitudinal side-by-side relation shown in FIGS. 7 and 8, the compartment 54 is divided into two subcompartments or bays 68, each formed by the rim or curved wall portions 65 and configured to support and laterally enclose a single one of the coin cell batteries 66. The far or rearwardmost bay 68 includes a recess or well 70 in a substantially flat bottom surface 71 thereof configured to snugly fit a contact 72, such as a tab-shaped blade connector, coupled to the switch device 56. Accordingly, the well 70 preferably is of a generally rectangular configuration. In addition, the contact 72 includes a bent vertical contact wall portion 74 which fits into a gap in one of the curved wall portions 65, as shown in FIG. 8. The contact 72 is electrically connected to the switch device 56, which as described above, is attached to the contact 57 of the LED 18. Specifically, a wire 76 extends from the contact 72 to the switch device 56 by being secured within a space provided between portions of the rim 65 above or below the other bay 68, preferably depending on the positioning of the switch device 56. The wire 76 can be at least partially covered by an insulating material or jacket along at least a portion of its length. As illustrated, the contact 72 is configured to contact the cathode of the battery 66. The other bay 68 may be positioned adjacent to the switch device 56 and include a recess 78 in a substantially flat bottom surface 79 thereof configured to support a second contact 80 of the light source 18. As illustrated, the contact 80 is one of the elongate leads stemming from the light source 18 and is received in an elongate narrow or thin recess or well 78 to be configured to contact the anode of the other battery 66. The wells 70 and 78 allow the corresponding contacts 72 and 80 to be received in the battery subcompartments while the facing surface of the batteries 66 is in contact therewith and can rest or be supported by the substantially flat bottom surfaces 71 and 79 of the subcompartments 68. So configured, the cathode of one battery 66 is coupled to the switch 56, which is coupled to the LED 18, and the anode of the other battery 66 is coupled directly to the LED 18. This configuration allows the switch device 56 to control power to the LED 18 to turn it on and off. While one specific configuration of the contacts 72, 80 and batteries 66 are illustrated, the components may also be reversed if so desired.

Further, the switch device 56, rather than having two positions corresponding to "on" and "off" positions as described above, can include three positions of the slide actuator 56a with one position being an "off" position, another position being a "low, on" position and the last position being a "high, on" position so that the switch device 56 can control the lighting power generated by the LED 18 to provide either lower intensity lighting or higher intensity lighting based on the corresponding "on" position of the actuator 56a. Referencing FIGS. 9 and 10, the switch device 56 has the actuator 56a slidably mounted to switch housing 300 which has four pins 302, 304, 306, and 308 depending therefrom. The outer pins 302 and 308 are electrically connected to the LED 18 via contact 57 with pin 308 including a resistor in the electrical path between it and the LED 18 to reduce power to the LED 18 over that supplied via pin 302. Pin 304 is electrically connected to the power source 66 and specifically the cathode of battery power source 66 received in the far bay 68 via tab contact 72 and wire 76. The pin 306 is not electrically connected to either the LED 18 or the power source 66. In each actuator position, two of the pins 302-308 are electrically connected by a conductive bar 310 shifted by the switch actuator 56a. Thus, the high brightness or light intensity position of the switch actuator 56a is the left endmost position in FIG. 9 and is depicted as position "A" in FIG. 10 with LED pin 302 and power pin 304 electrically connected via switch bar 310. The off position is the intermediate or middle position of the switch actuator 56a in the left-to-right direction shown in phantom in FIG. 9 and is depicted as position "B" in FIG. 10 with power pin 304 connected to electrically inactive pin 306. The low brightness or light intensity position of the switch actuator 56a is the right endmost position of the switch actuator 56a shown in phantom in FIG. 9 and is depicted as position "C" in FIG. 10 with power pin 304 and LED pin 308 electrically connected via switch bar 310.

Alternatively, the three positions of the switch actuator 56a can be an end "on" position, an intermediate "off" position, and an opposite end "temporary on" position. In this form, the pins 302-308 would be electrically connected to the LED 18 or power source 66 or inactive as in the above-described 3-position switch device 56, although no resistor is needed in the electrical path between LED pin 308 and LED 18. The switch device 56 in this form allows the user to slide the actuator 56a to the left endmost position corresponding to the "temporary on" position with the corresponding LED 18 only providing light for as long as the switch actuator 56a is maintained in the "temporary on" position. In this regard, the switch actuator 56a can include a biasing mechanism such as in the form of compression spring 312 mounted between switch housing wall 314 and switch actuator base 316 with the spring 312 operable to urge the actuator 56a back to the intermediate "off" position when it is slid toward the "temporary on" position. Thus, for example, the "temporary on" position allows a potential purchaser of the lighted glasses 10 to try the lights via sliding and holding the switch actuator 56a to the "temporary on" position only for as long as needed for their purchasing decision. Once they are satisfied with their testing of the lighting function, they can release the switch actuator 56a which will then automatically return to the "off" position due to the bias force provided thereto by the spring 312. This avoids the need for using the "on" position for this purpose which requires the user to slide the switch actuator 56a back to the "off" position and which if not done undesirably reduces or can eventually use up the power in the battery power source 66. Of course, the "temporary on" position also provides the owner of the glasses 10 a similar advantage. Manifestly, no such spring would be provided for the earlier described 3-position switch device 56 without a "temporary on" position. In addition, it should be understood that the specific arrangement of pins and switch positions for the 3-position switch devices 56 can be varied from that described herein.

By one approach, the raised portion 53 of the inner surface portion 52 includes a removable cover 82, as shown in FIGS. 6 and 7, configured to securely fit over the compartment 54 to secure the batteries 66 within. The cover 82 may optionally include biased members or springs on an inner surface thereof to apply outward pressure on the batteries 66, so the batteries 66 are held against the contacts 72, 80. The cover 82 is removably secured to the compartment 54 by a tongue and groove mechanism securing depending sides and the distal end of the cover 82 using edges or slots provided in the rim 65. Other suitable securing mechanisms can also be utilized. In the illustrated form, the cover 82 is formed from metal (as opposed to the preferred plastic of the eyeglasses and temple portions thereof) in order to limit the thickness of the temple arm member 12. If the cover 82 were fabricated of a plastic similar to the temple arm 12, the cover 82 would have an increased thickness, which would detract from the thin configuration of the temple arm members 12.

As illustrated and described, the temple arm members 12 include all the components necessary to illuminate an area forwardly of the wearer, including the LEDs 18 and the electrical system 50 therefor. Accordingly, this configuration allows the cross-frame member 14 to be easily interchangeable because no electrical components span the pivot connections and/or the hinge 30 between the temple arm members 12 and the cross-frame member 14. Similarly, no electrical components are included in the cross-frame member 14, avoiding the performance problems associated with prior hinge switches. In addition to this, the electrical system 50 has its components disposed positioned entirely on or recesses in the inner surface portion 52 of each temple arm member 12, and the electrical components do not project above the upper surface 62 or below the lower surface 64 of the temple arm member 12. This configuration not only substantially hides the components of the electrical system 50 from view when the illuminated eyewear 10 is worn, but it also protects the electrical components from damage when the lighted eyeglasses 10 are in the folded, storage configuration.

Figure 11:
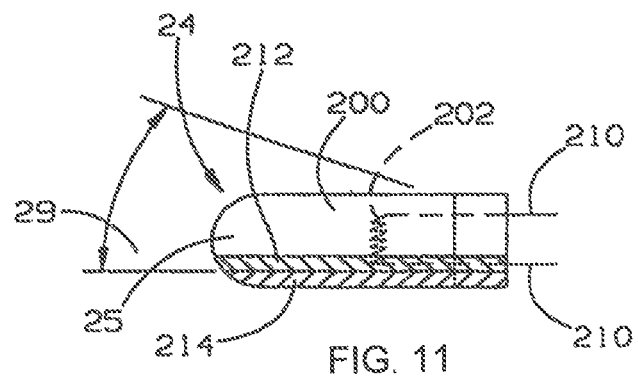
FIG. 11 is a enlarged side elevational view of an exemplary LED for use with hands-free lighting devices showing an LED lens having light reflective and blocking coatings thereon.

As illustrated in FIG. 11, a detailed view of a modified or light-concentrating LED 125 is shown that may be employed with the lighted eyeglasses 10. The light-concentrating LED 125 is configured to optimize the light output therefrom and minimize wasted light. Alternatively, or in addition to the above, the light-concentrating LED 125 is configured to reduce the amount of stray light such as light that can cause unwanted glare or the like. The light-concentrating LED 125 may be any common LED that includes a housing or lens 200 of a typical translucent or transparent housing, a LED chip or diode 202 for illumination, and electrical leads 210, such as an anode and cathode leads, extending therefrom. However, the light-concentrating LED 125 also includes at least one material or coating 212 and, preferably, a second material or coating 214 on a predetermined portion of the lens 200, such as along a portion of an outside surface thereof. The materials 212 and 214 are advantageous because they preferably optimize or concentrate the light output from the light-concentrating LED 125 and minimize stray or otherwise wasted light by providing a modified light cone 129 that emanates from the light-concentrating LED 125.

The first material 212 may have a reflective surface and is applied to a lower portion or an underside of an outer surface of the light-transmissive lens 200 of the light-concentrating LED 25. The material 212 is designed to optimize and/or concentrate the light output that is projected outwardly from the LED lens body 200 in a predetermined direction or light cone. As shown by the modified light cone 29, the first material 212 concentrates the light emanated from the LED chip 202 in a generally axial direction outwardly from the light-concentrating LED 25 and also generally upwardly away from the first material 212. The first material 212 may be a silver or nickel coating or a lithium silver plating or nickel lithium planting; however, other reflective coatings are also suitable.

Figure 9:
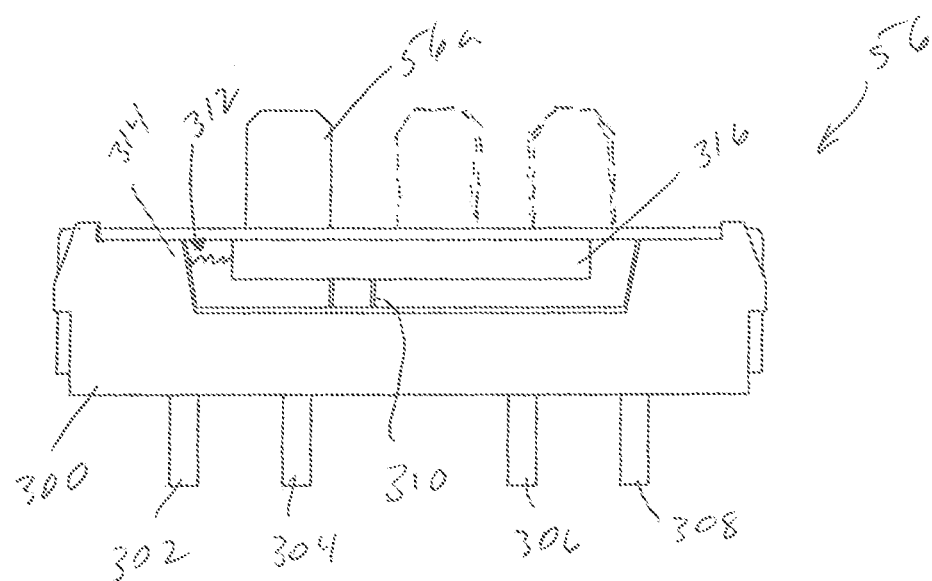
FIG. 9 is an elevational view of a 3-position switch device showing four contact pins depending therefrom.
Figure 10:
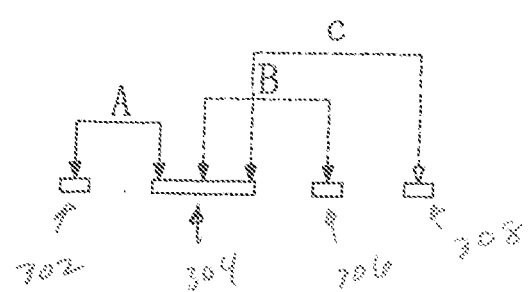
FIG. 10 is a schematic view showing the three different pin connections for the 3-position switch device of FIG. 9.

With use of the first material 212, the normal light cone projected from the LED is reduced in size by approximately 50 percent, and thus the amount of light in the modified cone 29 is doubled or increased by approximately 100 percent over the light concentration in a normal light cone that is twice as large as the cone 129. While the first material 212 is illustrated in FIG. 9 on the lower or bottom portion of the light-concentrating LED 125, it may also be included on other portions of the light-concentrating LED 125 as desired depending on how the light from the light-concentrating LED 125 needs to be focused or directed.

The second material 214 is a black or other dark colored coating for blocking the light from being emanated in a particular direction and may be any opaque coating applied to the light-concentrating LED 125. As illustrated in FIG. 9, the second material 214 is preferably applied to the light-concentrating LED 125 beneath the first material 212 and therefore, also on a lower portion of the light-concentrating LED 125. Thus, in the illustrated form, the first reflective material 212 is between the LED lens 200 and the second material 214. Alternatively, the coatings 212 and 214 could be applied on the inner surface of the LED lens with the reflective coating 212 being applied on the underlying coating 214 which is applied to the lens surface. As a result, when the light-concentrating LED 125 is installed on the hat 100 as described above, the material 214 minimizes the glare from the LEDs in the wearer's eyes because the second material 214 substantially prevents light from being projected in a downward direction below the brim 116 directly in front of the wear's eyes. In this regard, it is preferred that no matter where the first coating 212 is applied to the light-concentrating LED 125 to concentrate and direct the light, the second material 214 is preferably applied in such a manner that when the light-concentrating LED 25 is installed on the hat 100, the second material 212 is in an orientation to block the light that may be emanated from the LED towards the wearer's eyes. In other words, the second material 212 will be on the lens 200 so that it is between the LED chip 202 and the eyes of the hat wearer.

While the first and second materials 212 and 214 are illustrated as extending the entire axial length of the LED lens 200, depending on the modified light cone 29 desired, the materials 212 and 214 may also only extend a portion of the axial length of the LED lens 200 or extend in varying lengths on the lens 200. Preferably, the materials 212 and 214 will extend at least from the electrical connections 210 past the LED chip 202. Moreover, while the light-concentrating LED 25 has been described with both coatings 212 and 214, the light-concentrating LED 25 may also incorporate each coating separately depending on the light output, direction, and/or concentration desired.

Figure 11A:
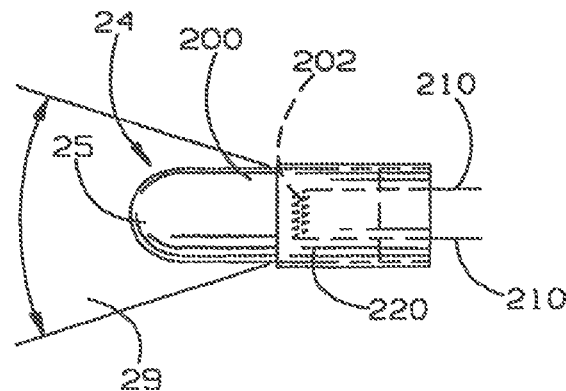
FIG. 11A is an enlarged side elevational view of an alternative LED showing reflective tape wrapped about the LED lens.

Alternatively, as shown in FIG. 11A, the light-concentrating LED 25 may have a reflective tape 220 wrapped therearound instead of or in combination with the materials 212 and 214, or just the light blocking material 214. For instance, the tape 220 may be wrapped radially around the light-concentrating LED 25 such that the tape 220 circumscribes the lens 200 and extends axially generally parallel to the electrical leads 210 to the LED chip or diode 202. However, the tape 220 may also extend different axial lengths on the light-concentrating LED 25 depending on the light cone 29 desired. For example, if a more concentrated or narrow light beam is desired, then the tape 220 may extend axially from the electrical leads 210 beyond the diode 202 so a more narrow or concentrated light cone 29 is formed. On the other hand, if a more diffuse or wide beam is desired, then the tape 220 may extend only a short distance and be axially spaced rearward from the diode 202 so a wider light cone 29 is formed. Manifestly, if there is a reflective layer only on one side of the tape 220, then the reflective layer on the tape 220 is to be facing inward towards the diode 202 so that the reflective tape 220 will concentrate the light being emanated from the diode 202 and reflect any stray light inwardly into the desired light cone 29.

Referring now to FIGS. 12-25, another hands-free lighting embodiment is illustrated, which includes lighted eyeglass frames 500. In general, the lighted eyeglass frame 500 described herein includes a light source mounted onto a portion of the frame for directing light forwardly of the wearer together with a variety of different options to energize the light source.

In one embodiment, as shown in FIGS. 12-15, a light module 518 with a light source or LED 524 is mounted to a collapsible eyeglass frame assembly 500 to form the lighted eyeglasses. The eyeglass frame assembly 500 is configured as a typical eyeglass frame assembly having a pair of spaced temples or arms 502, and a cross-frame member 504 extending therebetween and pivotally connected to each of the temples at either end thereof. The cross-frame member 504 includes an appropriate bridge structure intermediate the ends so that the frame 500 may rest on the bridge of an individual's nose (FIG. 14). The temples 502 extend rearwardly from the spaced ends of the cross-frame member 504 and may also include a downwardly projecting ear portion 506 so that the end 505 of each temple 502 may conform to or extend around an individual's ear (FIG. 12A). Alternatively, the temples may extend generally straight back from the cross-frame member 504 without the ear portion 506 (FIG. 17a). The frame assembly 500 shown in FIGS. 12-15 includes both a retracted position and an extended position.

In the retracted position or state the cross-frame member 504 and temples 502 are preferably collapsed such that the frame 500 is in a more compact form for ease of storage and protection (FIGS. 12B, 13B, 15A, and 15B). As further discussed below, the cross-frame member 504 and each temple 502 separately retract to form the compact structure. In the retracted state, the cross-frame member 504 and temples 502 are generally protected by the light module 518 because, as further described below, the cross-frame member 504 and temples 502 are partially or substantially covered by the light module 518. In other words, the arms 502 will generally not project very far if at all beyond the light modules, and only a small section of the cross-member 504 will be exposed to extend between the modules 518, as can be seen in FIGS. 15A and 15B. Furthermore, in the retracted position, the lighted frame assembly 500 is sufficiently compact to be used as a mini-flashlight. In the retracted position, the modules 524 generally form a double-module LED flashlight, as shown in FIG. 15B.

The illustrated lighted eyeglasses 500 include the light modules 518 mounted to each of the temples 502. The LEDs 524 are configured to provide illumination forwardly of the eyeglasses 500 within the field of view of a wearer. To this end, the light module 518 or the LEDs 524 may be canted inwardly and/or downwardly, such as about 5 degrees, to provide a light beam that is more focused into a wearer's field-of-view. Canting the LEDs in their respective housings can be done as described in Applicant's U.S. Pat. No. 6,612,696, which is incorporated as if reproduced in its entirety herein. Further, the light beam is provided more directly in the wearer's field of view by being angled inwardly and downwardly relative to the frame temples 502. If the light modules 518 or LEDs 524 are canted in such a manner, it should not be necessary to manually pivot or cant the light to direct the illumination.

More specifically, the light module 518 has the LED 524 protruding therefrom for emanating light therefrom. The modules 518 are mounted to each of the temples 502. The module 518 preferably houses the components needed to illuminate the LEDs 524. For instance, the module 518 has a switch that includes an actuator portion 517 that projects through an elongated slot 519. The actuator portion 517 is designed such that a user's thumb or finger can quickly and easily engage the actuator portion 517 to push or pull the switch for sliding in either one of two directions to turn the light module 518 on and off. The elongated slot 119 is sized such that the switch actuator can be moved only a preset distance, thereby enabling the on and off functions to be accomplished with a minimum of motion. When the switch is moved to the "on" position, batteries that are internally housed in the light module 518 energize the LED 524. Similarly, when the switch is moved to the "off" position, the connection between the batteries and the LED 524 is broken and the LED 524 is turned off. In an exemplary form, the module 518 may be similar to the light modules illustrated and described in the previously incorporated '696 patent. As illustrated, the modules 518 may be integrally formed with the temples 502, but the modules 518 may also be separately mounted to the temples 502 with fasteners or the like as in the '696 patent.

As mentioned above, the eyeglass frame 500 includes both retracted and extended states. In this regard, each of the temples 502 may include interconnected segments or members 502a and 502b that can slide relative to each other so that the temple 502 may be shifted between a retracted position (FIGS. 12B and 13B) and an extended position (FIGS. 12A and 13A). Similarly, the cross-frame member 504 also preferably includes interconnected segments or members 504a, 504b, 504c, and 504d that retract and extend in a similar manner (FIGS. 14 and 15). The segments of the temples and cross frame member can also telescope to extend and retract with one of the segments having a tubular or c-shaped structure so that the connected segments can slide in and out therefrom. While the cross-frame member 504 and temple 502 are illustrated with specific number of segments, more or less segments may also be used depending on the size and strength of the frames desired.

More specifically, in the retracted condition of the temples 502, the temple segment 502b retracts or slides relative to temple segment 502a either into a temple receiving compartment in the module 518 or alongside the module 518 at an outer surface thereof so that at least a portion of each of the temple segments are super-imposed over each other and overlap the module 518. As illustrated in FIG. 12B, in the retracted condition, the ear portion 506 extends beyond the module 518. However, the projecting ear portion 506 is much smaller than the fully extended temple arm 502. The extent to which the temple arm 502 projects beyond the module when the arm is retracted may vary depending on the size and angle of ear portion 506 as it is not uncommon for the configuration of the ear portion 506 to vary based on the comfort needs of the individual wearer. Alternatively, if the temples 502 do not have a specially contoured ear portion 506, but a straight temple portion, then substantially the entire temple 502 may overlap the module 518 when retracted. For example, as illustrated in FIG. 13B, if the temple portion 502 is generally straight, then the temple segments 502a and 502b may retract into a position such that each segment 502a and 502b substantially overlaps each other and the module 518 but for a small projecting end section 505 of the temple. In this configuration, substantially the entire temple 502 is protected from damage in the retracted state by the module 518 because the temple 502 is retracted into or alongside the module 518. The larger width size of the module 518 transverse to the length of the temple arm 502 protects the elongate, thin temple portion 502.

In the extended state of the temples 502, each of the segments 502a and 502b are extended outwardly from the module 518 so as to form traditional temples of common eyeglasses (FIGS. 12A, 13A, and 14). As illustrated in FIG. 13C, the temple segments 502a and 502b may include a releasable locking structure 508 therebetween such that the extended temple segments may be held in their extended and retracted positions. That is, the locking structure 508 may include, for example, a retaining sleeve member 508a through which the temple segments 502a and 502b extend, a boss or other protrusion 508b on an end of one of the temple segments and a corresponding detent or groove 508c on an adjacent end of the other temple segment that engage and register so that the protrusion 508b seats in the groove 508c upon the segments reaching a predetermined, extended position relative to each other to releasably hold the temple segments in the extended state. The locking structure 508 may also include stop members 508d on ends of each segment that interfere with the retaining member 508a to avoid having the temple arms separate from each other. In addition, the end 505 of the temple arm 502b may also include a detent 508c to engage the protrusion 508b when the temple arm 502b is retracted. Manifestly, the locations of the protrusions 508b and detent grooves 508c can be reversed, or a pair of protrusions 508b can be provided on one of the arm segments with a single groove 508c formed in the other arm segment.

Referring now to FIGS. 14, 15A, and 15B, as mentioned above, the cross-frame member 504 may also include a retracted and extended position. As illustrated in FIG. 14, the frame 500 is shown in the extended position resembling a traditional eyeglass frame. FIGS. 15A and 15B illustrate the cross-frame member 504 and temple arms 502 of the frame 500 in the retracted position with FIG. 15A showing the retracted temple arms 502 having arcuate ear portions 506 (FIG. 12B) and FIG. 15B showing the retracted, straight temple arms 502 (FIG. 13B).

To achieve the retracted position of the cross-frame member 504, a user slides the outer segments 504a and 504d of the cross-frame member 504 inwardly toward each other such that the temples 502 and the attached or integrated modules 518 are moved laterally toward each other. It can be appreciated that the cross-member frame 504 can be retracted with the temples 502 either in the retracted or in the extended positions. In order to retract and extend, the cross-frame member 504 also includes connected segments or members 504a, 504b, 504c, and 504d. A user slides the segments inwardly such that segment 504a and 504b overlap to retract one side of the frame 500 and the segments 504c and 504d overlap to retract the other side of the frame 500.

The cross-frame member 504 is extended in a reverse manner by sliding or extending the segments 504a and 504d outwardly. As with the temples 502, the cross-frame member 504 preferably includes a similar locking structure 508 so that the cross-frame member 504 can be releasably held in either the retracted or extended positions.

When both the cross-frame member 504 and each temple 502 are retracted, the frame 500 is significantly more compact than the traditional eyeglass frame as best shown in FIGS. 15A and 15B. Preferably, the fully retracted frame 500 is about as wide as the depth of two modules 518 and about as long as each module 518. As previously stated, a small section 505 of the ear portion 506 may extend beyond the modules 518 in the retracted state so that, if the temple arm is retracted into the light housing 518, the projecting section 505 allows the user to pull the temple arm out of the housing back to its extended position. In this compact state, the frame 500 is easily placed in a pocket, bag, or purse until hands-free lighting is needed. The frame 500 may be expanded to be used as hands free lighting as previously described or used in the compact condition as a compact hand-held flashlight. Moreover, in this compact state, the frame 500 is protected from damage as the frame does not have elongate members that are easily bent or broken. As previously described, when the frame 500 is in the retracted state, the cross-frame member 504 and temple arms 502 are slid either into or alongside the light module 518. Therefore, in this state, the larger module 518 protects the more narrow frame portions 502 and 504 from being damaged when in a pocket or purse, for instance.

The eyeglass frame 500 may also include lenses similar to traditional glasses. For example, the frame 500 may include reading lenses, prescription lenses, protective or safety lenses, magnifying lenses, clear or non-refractive lenses, or the like. If included, the lenses would generally depend from the cross-member frame 504 or the cross-frame member 504 could also include portions that encircle the lenses. The lenses may have a pivot connection to the frame where the cross-frame member 504 and the temple arms 502 are pivotally connected. In this manner, the edge of the lenses opposite the pivot connection (i.e., near the bridge) may pivot inwardly from the cross-frame member 504 to the temple arms 502 to facilitate the retraction of the cross-frame member 504. On the other hand, a top edge of the lenses may be pivotally mounted to the cross-frame member 504 so that when the frame is in a retracted condition, the lenses may be pivoted up to the retracted frame structure. In such configurations, the frame 500, even with optional lenses, may be retracted into a compact form. Alternatively, the eyeglass frame 500 may be devoid of such lenses so that the frame 500 is configured simply to provide a form of headgear that provides for hands-free lighting.

Referring to FIGS. 16-23, various alternative temple portions 602 are illustrated for the frame assembly 500. Herein, these alternative temple portions generally do not retract, but have different configurations and can include rechargeable batteries 600 and recharging contacts 603. As shown, the recharging contacts 603 include a positive contact 603a and a negative contact 603b, which may be in separate temple portions 602 (FIG. 24) or both in the same temple portion 602 (FIG. 23). The charging contacts 603 are for being electrically connected to corresponding contacts 654 of a separate battery charger.

The temple portions 602 include a light source 604, preferably an LED, housed within an opening or hollowed portion of the temple frame 610 and which protrude axially outward from the forward end 602a of the temple frame such that a light beam would be directed forwardly of the wearer, as previously described. The lights 604 may also be angled or canted inwardly or downwardly to provide a light beam more directly in the wearer's field of view. For example, the LED may tilt down about 5 degrees. The alternative temples 602 illustrated in FIGS. 16-23 generally can provide a more compact illumination device when worn than previously described with the light module 518 because the components to energize the light 604 are contained or integrated into the temple portions 602 rather than being within a separate module 518.

More specifically, FIGS. 16 and 17 illustrate two batteries 600 spaced longitudinally in the fore and aft direction that are housed internally in a forward portion 602b of the temple 602 adjacent pivot member 606. To contain the batteries, the forward portion 602b of the temple arm is enlarged in a direction transverse to its length and to the cross-frame member 504 with the lighted frames in their unfolded configuration for use. The forward portion 602b has a tapered configuration along its length. Also, the forward portion 602b is thicker than the narrower remainder or rear portion 602d of the temple arm with a shoulder 602c provided therebetween. The batteries 600 are in electrical communication with the recharging contact 603 at a distal end 605 of an ear portion 608 of the temple arm 602. As will be further described below, the recharging contacts 603 cooperate with contacts 654 of a separate battery charging module or unit 650. FIGS. 18 and 19 illustrate a similar battery arrangement, but show a temple 602 having a modified contour to house the longitudinally spaced batteries 600. Rather than a smooth taper, the forward portion of the arm has a rectangular configuration for receiving the batteries 600 therein.

FIGS. 20 and 21 illustrate an overlapping battery configuration where the batteries 600 are stacked in a side-by-side arrangement. In this arrangement, the temple frame or housing 610 need not be as long in the longitudinal direction as with the previous temple arms, but is wider or thicker in the lateral direction transverse to the fore and aft longitudinal direction to accommodate the stacked batteries 600.

FIGS. 22 and 23 illustrate another modified temple 602 that houses the batteries 600 within the rear ear portion 606, preferably in a longitudinally spaced arrangement to keep the width or thickness of the ear portion to a minimum. In this embodiment, the batteries 600 are closely positioned to the recharging contacts 603 to keep the length of the electrical connections therebetween to a minimum. Herein, the positive charging contact 603a and negative charging contact 603b are both disposed at the distal end 605 of the same temple portion 602. Such combined configuration allows a more compact battery charger because only one temple 602 is required to connect to the battery charger.

Referring to FIG. 24, the eyeglass frame 500 is illustrated with the modified temple portions 602 being connected to a stand-alone battery charger 650 with the positive contact 603a and negative contact 603b shown in separate temple arms 602. To charge the batteries 600 in the battery charger 650, the temple arms 602 are preferably pivoted inwardly toward the cross-frame member to fold the frame 500 into a retracted condition, the distal ends 605 of each temple arm 602 are then connected to a receiving base member 652, which may be included on a stand alone charger. Alternatively, the receiving base member 652 may be integrated within an eyeglass frame case. The battery charger 650 is plugged into a 110 volt wall outlet. The base member 652 has recharging contacts 654 that correspond with the recharging contacts 603 on the eyeglass frame temples 602, but have an opposite polarity. Therefore, when inserted in the battery charger 650, the batteries 600 are in electrical communication with a power source such that the batteries 600 may charged. Alternatively, the battery charger 650 may be configured to accept the eyeglass frame 500 with the temple arms 602 in an unfolded position, or may have a more compact configuration as previously mentioned, such as when only one temple arm 602 has both charging contacts 603a and 603b thereon.

Figure 25:
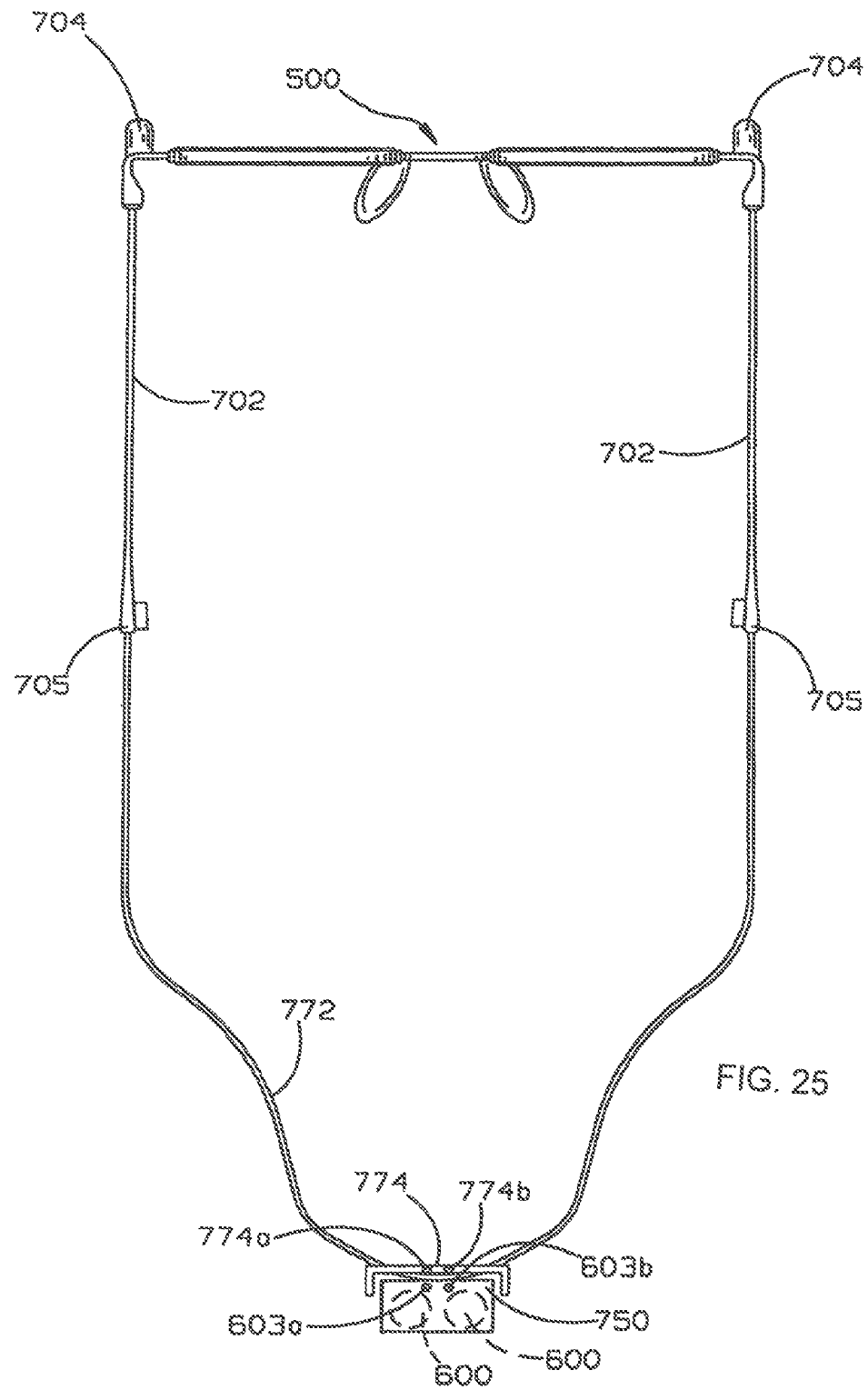
FIG. 25 is a plan view of alternative illuminated eyewear showing a power module carried on a lanyard for the frames.

Referring to FIG. 25, a modified placement of the rechargeable batteries 600 is illustrated on an alternative frame 500. In this embodiment, a power module or battery pack 750 is connected or attached to a lanyard 772 that is joined to the distal ends 705 of more traditional temple arms 702 (i.e., without included batteries). The lanyard 772 is a flexible member that joins each distal end 705 of the temple arms 702 and also functions a retaining member to hold the frames 500 around a wearer's neck when not in use. Generally, the lanyard 772 will be draped about the wearer's neck and upper back. The alternative frame 500 in FIG. 27 also includes lights 704, either in the frame as shown or in a separate module, that are in electrical communication with the battery pack 750 through the lanyard 772 and temple arms 702. In this regard, the temple arms 702 and lanyard 772 can have a hollow configuration to allow for electrical leads to be run through each.

The battery pack or module 750 houses the rechargeable batteries 600 and releasably mounts into a receiving port 774 attached to the lanyard 772. Generally, the port 774 may be centrally located between the ends of each temple portion 705 on the lanyard 772 because such an intermediate position along the length of the lanyard 772 provides balance to the lanyard 772 when worn. Therefore, in such central location, the pack or module 750 would comfortably rest on the back of a wearer as the lanyard 772 hangs down onto the shoulders and back during use. However, other locations on the lanyard are also acceptable. The receiving port 774 includes contacts 774a and 774b that, when the battery pack or module 750 is snugly and captively received in the port 774, are in electrical communication with the contacts 603a and 603b on the battery pack or module 750 to provided electrical power from the batteries to the lights 704.

To recharge the batteries 600, the pack or module 750 may be removed from the port 774 and plugged into a separate battery charger or power source (not shown). In this regard, the positive and negative contacts 603a and 603b mate with similar contacts in the battery charger. Alternatively, the batteries 600 of the pack or module 750 may be charged while still mounted to the port 774 such as by the provision of separate recharging contacts (not shown).

Housing the batteries 600 in the pack or module 750 that is electrically joined to the frame 500 through the lanyard 772 is advantageous in that the batteries 600 are contained in a separate member, such as the power module 750, that does not affect the contour of the temple arms 702. Accordingly, the temple arm 702 may be a more traditional, straight temple portion rather than the temple arms 602 contoured to contact the batteries 600 as shown in FIGS. 16-23 as generally only the electrical wiring is included therein.

Referring to FIGS. 26-29, and an alternative LED assembly 3010 is illustrated that includes an LED 3012 and a covering 3014. The LED 3012 includes a lens 3016 and two spaced electrical leads 3018a and 3018b. The lens 3016 is formed from a molded plastic with a generally cylindrical portion 3016a and a dome portion 3016b extending about a distal end of the lens 3016. Within the cylindrical portion 3016a, the LED includes a diode, illumination chip, or other light source 3016c. The covering 3014 includes a first portion 3014a surrounding at least a portion of the lens 3016 and a second portion 3014b surrounding at least a portion of the leads 3018a and 3018b. With such configuration, the covering 3014 provides support to the LED leads and, preferably, modifies the light beam generated by the LED 3012.

More specifically, the first covering portion 3014a extends around a portion of the LED lens 3016, such as the lens cylindrical portion 3016a and therefore, allows the LED 3012 to function similar to the previously described light concentrating LED 25 (FIGS. 11 and 11A) to focus or minimize stray light emissions. That is, the covering 3014a extends around the cylindrical portion 3016a a predetermined axial length beyond the light chip 3016d in order to concentrate the light cone formed or minimize stray light emissions. Depending on the degree of light concentration desired, the covering portion 3014a may extend more or less axial length beyond the light chip 3016d. In one form, the covering portion 3014a generally extends about 3/16 to about 1/4 of an inch along the lens cylindrical portion 3016a.

The second covering portion 3014b extends around the LED leads 3018a and 3018b and provides support and strength thereto. Preferably, the second covering portion extends about 3/16 to about 1/4 of an inch along the leads; however, other lengths are suitable depending on the size of the covering and LED and the desired amount of support and strength needed on the LED. The second covering portion 3014b minimizes strain on the leads 3018a and 3018b, and particularly, minimizes strain at an interface 3020 between the leads 3018a, 3018b and the lens 3016. The second covering portion 3014b, therefore, renders it more difficult to bend, warp, or otherwise damage a single lead 3018a or 3018b at the interface 3020 because the second covering portion 3014b combines each lead 3018a and 3018b together in a more rigid cooperating assembly. The photovoltaic cell can be used to power other electrical devices which can include radios, MP3 players such as iPods, and telephones.

The covering 3014 is preferably a material that can be wrapped tightly around the LED 3012 as illustrated in FIGS. 27-29. For example, a preferred material for the covering 3014 is a tube of bi-axially oriented PVC that can be tightly wrapped around the LED portions by shrink wrapping the covering 3014 using heat. However, other materials capable of being tightly wrapped around the LED by shrink wrapping or other mechanisms using heat or other stimulus are also acceptable for the covering 3014.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. Illuminated eyewear comprising:
 a pair of temple arm members each having and forward and rearward ends;
 inner and outer surface portions of each temple arm member having a flat configuration and extending lengthwise between the forward and rearward temple arm ends;
 a front support including a bridge portion extending between the forward ends of the temple arm members with the temple arm members and bridge portion adapted to be supported on a user's ears and nose;
a pivot connection between each of the front ends of the temple arm members and the front support for pivoting of the temple arm members relative thereto;
a light source mounted to each of the temple arm members;
a plurality of disc-shaped batteries for providing power to the light sources;
a narrow width battery compartment of each of the temple arm members between the respective flat inner and outer surface portions thereof sized so that a pair of the disc batteries are received in a non-overlapping, side-by-side arrangement in each compartment with main surfaces of the batteries facing the flat inner and outer surface portions of the temple arm members;
an electrical connection between the batteries and the light sources powered thereby with the electrical connections mounted to the temple arm members so that with the light sources, the associated batteries and the electrical connections therebetween mounted to the temple arm members, there are no electrical components that span the pivot connections between the temple arm members and the front support; and
a slide switch device mounted to each of temple arm members with each slide switch device having a slide actuator projecting from the corresponding temple arm member and configured for sliding therealong.

2. The illuminated eyewear of claim 1 wherein the light sources are each mounted adjacent the forward end of the corresponding temple arm member, and the front support comprises a cross-frame member having opposite end portions adjacent the forward ends of the temple arm members with the end portions comprising blinder portions each having a blinder surface that extends adjacent the corresponding light source to minimize glare from the light sources.

3. The illuminated eyewear of claim 2 wherein the light sources are LEDs that generate a cone of light of a predetermined angle, and the blinder surfaces are configured to generally extend along the light cone to avoid significant interference therewith.

4. The illuminated eyewear of claim 1 wherein the battery compartments each include a removable cover along which the inner surface portion of the respective temple arm members extends.

5. The illuminated eyewear of claim 1 wherein the slide switch devices are mounted to the temple arm members so that the slide actuators thereof are each disposed for sliding along the inner surface portion of the respective temple arm members.

6. The illuminated eyewear of claim 5 wherein the slide switch actuators are each adjacent the pivot connection at the front end of the respective temple arm members.

7. Illuminated eyewear comprising:
a pair of temple arm members each having forward and rearward ends and a fore-and-aft temple axis along which the temple arm member generally extends between the forward and rearward ends thereof;
a front support including a bridge portion extending laterally between the forward ends of the temple arm members;
a hinge between each of the forward ends of the temple arm members and the laterally extending front support to allow each temple arm member to be shifted between an open configuration with the temple arm members pivoted away from the laterally extending front support to extend rearwardly therefrom, and a closed configuration with the temple arm members pivoted toward the laterally extending front support to extend therealong adjacent thereto;
laterally inner surface portions of the temple arm members that generally face laterally inwardly toward each other with the temple arm members shifted to the open configuration thereof;
a light source mounted to each of the temple arms for projecting light therefrom;
a power source mounted to each of the temple arms for providing power to the light sources;
a slide switch mounted to each of the temple arm members for turning the light sources on and off;
a recessed cavity in each of the laterally inner surface portions of the temple arm members sized for receiving the power source and a portion of the slide switch therein so that the presence of the power source and the slide switch portion is substantially hidden from view when the illuminated eyewear is worn, the recessed cavities each being divided into adjacent subcompartments for the power source and the slide switch portion with the subcompartments being disposed longitudinally adjacent to each other along the respective fore-and-aft temple axes, and the subcompartments further including a space between the subcompartments for the power source and the slide switch portion in which an electrical connection extending substantially longitudinally between the power source and the slide switch portion is received.

8. The illuminated eyewear of claim 7 wherein the power source comprises a pair of disc-shaped batteries, and the recessed cavity is configured to receive the batteries in a longitudinal and non-overlapping side-by-side arrangement so that the thickness each of the temple arm members at the recessed cavity is only slightly thicker than the thickness of one of the batteries.

9. The illuminated eyewear of claim 8 wherein the recessed cavity including the adjacent subcompartments of each temple arm member comprises a rearward battery subcompartment and a forward battery subcompartment formed by curved wall portions for the pair of batteries and a slide switch portion subcompartment adjacent to and forwardly of the forward battery subcompartment.

10. The illuminated eyewear of claim 9 wherein the battery subcompartments each include a well that are each sized to receive an electrical contact therein with one of the contacts being from the slide switch and the other contact being from the light source of the respective temple arm members.

11. The illuminated eyewear of claim 7 wherein the slide switch of each temple arm member is mounted thereto so that a slide switch actuator of each of the slide switches is slidable along the inner surface portion of the corresponding temple arm member adjacent the hinge associated therewith.

12. The illuminated eyewear of claim 11 wherein the hinge includes hinge portions of each of the temple arm members at the forward ends thereof and at opposite ends of the front support, and the slide switch actuator is oriented to either be vertically above or below the corresponding hinge portion of the temple arm member to which the slide switch including the slide switch actuator is mounted.

13. The illuminated eyewear of claim 7 wherein laterally inner surface portions of each of the temple arm members includes a removable cover sized to extend over the recessed cavity for closing the power source therein.

14. The illuminated eyewear of claim 7 wherein the slide switches are each three position switch devices for providing high and low intensity light from the associated light source or for providing both an "on" position and a "temporary on" position of the associated light source.

\* \* \* \* \*